(12) United States Patent
Wu et al.

(10) Patent No.: US 11,838,215 B2
(45) Date of Patent: Dec. 5, 2023

(54) DATA STREAM CLASSIFICATION METHOD AND RELATED DEVICE

(71) Applicant: Huawei Technologies Co., Ltd., Shenzhen (CN)

(72) Inventors: Jun Wu, Nanjing (CN); Xinyu Hu, Nanjing (CN); Yali Wang, Beijing (CN); Xiaoyun Si, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/695,491

(22) Filed: Mar. 15, 2022

(65) Prior Publication Data

US 2022/0210082 A1 Jun. 30, 2022

Related U.S. Application Data

(63) Continuation of application No. PCT/CN2020/115693, filed on Sep. 16, 2020.

(30) Foreign Application Priority Data

Sep. 16, 2019 (CN) .......................... 201910872990.0

(51) Int. Cl.
*H04L 47/2441* (2022.01)
*H04L 47/20* (2022.01)
*H04L 69/22* (2022.01)

(52) U.S. Cl.
CPC .......... *H04L 47/2441* (2013.01); *H04L 47/20* (2013.01); *H04L 69/22* (2013.01)

(58) Field of Classification Search
None
See application file for complete search history.

(56) References Cited

U.S. PATENT DOCUMENTS

| 8,682,812 | B1 | 3/2014 | Ranjan |
| 9,094,288 | B1 | 7/2015 | Nucci et al. |

(Continued)

FOREIGN PATENT DOCUMENTS

| CN | 105007282 A | 10/2015 |
| CN | 107360032 A | 11/2017 |

(Continued)

OTHER PUBLICATIONS

Al Khater Noora, "Network traffic classification techniques andchallenges," 2015 Tenth International Conference on Digitalinformation Management (ICDIM), IEEE, Oct. 21, 2015, XP032849962, 6 pages.

(Continued)

*Primary Examiner* — James A Edwards
(74) *Attorney, Agent, or Firm* — Conley Rose, P.C.

(57) ABSTRACT

A data stream classification method includes obtaining, based on a packet feature of a current data stream and a behavior classification model, at least one first confidence that is of the current data stream and that corresponds to at least one data stream class, where the behavior classification model is based on a plurality of data stream samples; obtaining, based on feature information of the current data stream and a content classification model, at least one second confidence that is of the current data stream and that corresponds to the at least one data stream class, where the content classification model is based on one or more historical data streams; and determining a data stream class of the current data stream based on the at least one first confidence and the at least one second confidence.

20 Claims, 8 Drawing Sheets

(56) References Cited

U.S. PATENT DOCUMENTS

| | | |
|---|---|---|
| 2007/0242627 A1 | 10/2007 | Thai et al. |
| 2013/0117205 A1 | 5/2013 | Dubois et al. |
| 2014/0219101 A1 | 8/2014 | Horovitz et al. |
| 2014/0321290 A1* | 10/2014 | Jin .................. H04L 47/2441 370/241 |
| 2015/0007252 A1* | 1/2015 | Kazachkov ............ G06F 21/57 726/1 |
| 2015/0356451 A1* | 12/2015 | Gupta .................. G06F 21/552 706/46 |
| 2017/0364794 A1 | 12/2017 | Mahkonen et al. |
| 2019/0394527 A1* | 12/2019 | Chandrasekhar .. H04N 21/6125 |

FOREIGN PATENT DOCUMENTS

| | | |
|---|---|---|
| CN | 107360159 A | 11/2017 |
| CN | 108173708 A | 6/2018 |
| CN | 108200032 A | 6/2018 |
| CN | 108650195 A | 10/2018 |
| CN | 108667747 A | 10/2018 |
| CN | 108900432 A | 11/2018 |
| CN | 109067612 A | 12/2018 |
| CN | 109818976 A | 5/2019 |
| CN | 110048962 A | 7/2019 |
| CN | 110138681 A | 8/2019 |
| JP | 2007228489 A | 9/2007 |
| JP | 2009533970 A | 9/2009 |
| JP | 2013127504 A | 6/2013 |
| JP | 2017139580 A | 8/2017 |
| WO | 2011114060 A2 | 9/2011 |

OTHER PUBLICATIONS

Goli Yoga Durgadevi, "Network Traffic ClassificationTechniques—A Review," 2018 International Conference oncomputational Techniques, Electronics and Mechanicalsystems (CTEMS), IEEE, Dec. 21, 2018, XP033580860, 4 pages.

Zeng Yi, "Deep-Full-Range: A Deep Learning Based Network Encrypted Traffic Classification and Intrusion Detection Framework," IEEE Access, vol. 7, XP011718851, 10 pages.

ETSI GS ENI 001 V1.1.1, Apr. 2018, "Experiential Networked Intelligence(ENI); ENI use cases," 43 pages.

ETSI GS ENI 002 V1.1.1, Apr. 2018, "Experiential Networked Intelligence (ENI); ENI requirements," 16 pages.

ETSI GS ENI 005 V1.1.1, Sep. 2019, "Experiential Networked Intelligence (ENI); System Architecture," 98 pages.

Silver Peak, "Routers were invented when posting pictures meant taping up Polaroids," 2017, 9 pages.

Zhou Ding-ding, et al, "Traffic Classification Based on Bayesian Updating Method," 2013, 7 pages.

Cisco Systems, Inc., "Enterprise QoS Solution Reference Network Design Guide Version" Version 3.3, Nov. 2005, 330 pages.

* cited by examiner

| IP address | Port | Protocol | Data stream class |
|---|---|---|---|
| 10.129.56.39 | 443 | TCP | Desktop cloud |
FIG. 5
| IP address | Port | Protocol | Data stream class |
|---|---|---|---|
| 10.129.56.39 | 443 | TCP | Video conferencing |
FIG. 6
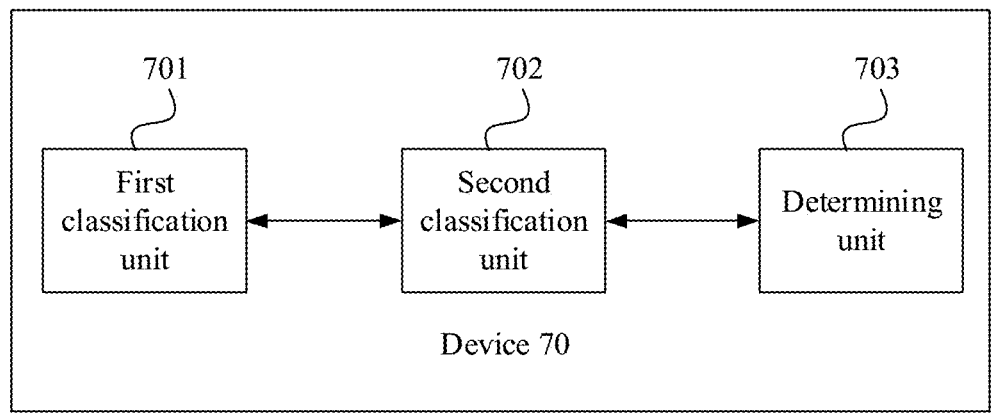
FIG. 7
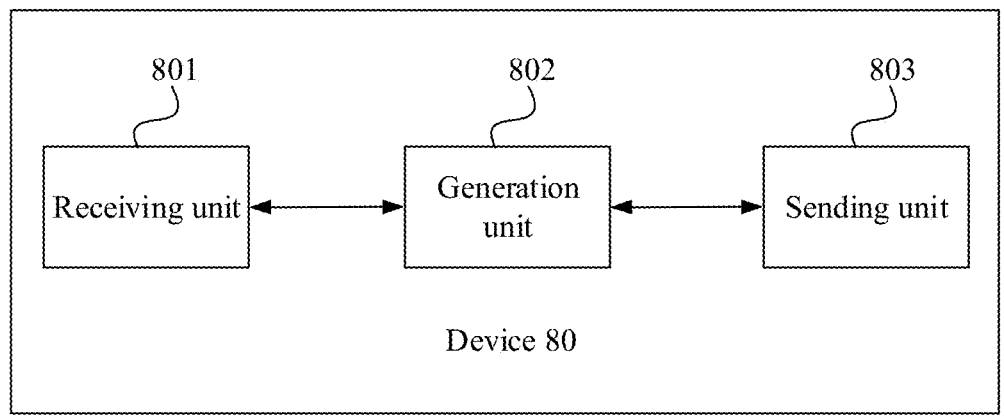
FIG. 8

DATA STREAM CLASSIFICATION METHOD AND RELATED DEVICE

CROSS-REFERENCE TO RELATED APPLICATIONS

This is a continuation of International Patent Application No. PCT/CN2020/115693 filed on Sep. 16, 2020, which claims priority to Chinese Patent Application No. 201910872990.0 filed on Sep. 16, 2019. The disclosures of the aforementioned applications are hereby incorporated by reference in their entireties.

TECHNICAL FIELD

The present disclosure relates to the field of computer technologies and the communication field, further to application of artificial intelligence (AI) in the field of computer technologies and the communication field, and in particular to a data stream classification method and a related device.

BACKGROUND

With rapid development of computer technologies, more enterprises use private office applications such as desktop cloud, voice conferencing, and video conferencing for work. Proper configuration of quality of service (QoS) priorities, real-time routing, and the like is usually needed to properly arrange service traffic and improve service reliability. However, an application type (namely, a data stream class) to which a current office application belongs needs to be obtained first for proper configuration of the QoS priorities, the real-time routing, and the like.

The following two manners are mainly used to obtain a type of an office application. A first manner is based on manual classification, and is mainly manually configuring a rule to match a keyword (including header data, payload data, or the like) in network traffic, to classify the application type. However, the manual classification is time-consuming and labor-consuming. In addition, with dynamics brought by cloud-based enterprise office applications, transmission encryption is usually performed for security purposes. As a result, it is difficult to manually set a classification rule for the application type, and therefore it is difficult to classify the application type. A second manner is based on offline learning, and is mainly pre-collecting sample data, labeling the sample data manually or by using a third-party tool, training a model offline based on the labeled sample data by using a machine learning algorithm or a neural network algorithm, and inferring an application type of current network traffic by using the offline trained model. However, the trained model may not be applied any longer each time an enterprise application is modified or updated. In addition, private applications are not implemented in a standardized manner, and models applicable to the same type of applications vary among different enterprises. In other words, when the foregoing trained model is applied to type classification of a modified or an updated application or an application of another enterprise, classification accuracy may be low.

How to quickly and accurately classify an application type (or a data stream class) of an office application is a technical problem being studied by a person skilled in the art.

SUMMARY

Embodiments of the present disclosure disclose a data stream classification method and a related device, to more accurately classify a data stream class.

According to a first aspect, an embodiment of this application provides a data stream classification method. The method includes obtaining, based on a packet feature of a current data stream and a behavior classification model, at least one first confidence that is of the current data stream and that corresponds to at least one data stream class, where the behavior classification model is a model obtained based on packet features and data stream classes of a plurality of data stream samples, and the packet feature includes one or more of a packet length, a packet transmission speed, a packet time interval, and a packet direction, obtaining, based on feature information of the current data stream and a content classification model, at least one second confidence that is of the current data stream and that corresponds to the at least one data stream class, where the feature information includes a destination address and a protocol type, the content classification model is a model obtained based on feature information and a data stream class of one or more historical data streams, and the data stream class of the historical data stream is obtained based on the behavior classification model, and determining a data stream class of the current data stream based on the at least one first confidence and the at least one second confidence.

In the foregoing method, the behavior classification model and the content classification model are involved. The behavior classification model is pre-obtained through training based on the packet features and the data stream classes of the plurality of data stream samples, and the content classification model is obtained through training based on the feature information of the data stream and the data stream class that is of the data stream and that is classified by using the behavior model. Therefore, the content classification model is an online learning model. The behavior classification model can classify data stream classes of some basic (or typical) data streams. Some features (such as the packet length and the packet transmission speed) of a data stream of a same class may change in a subsequent transmission process. Therefore, the class of the data stream is classified in other respects (such as the destination address and the protocol type) in combination with an online learning characteristic of the content classification model, to reduce an error in classifying the data stream class of the data stream in the data stream transmission process by using the behavior classification model. As a result, in this application, a classification manner in which the behavior classification model and the content classification model are combined is used to improve accuracy of classifying the data stream class of the data stream and improve classification generality, and can be applied to a plurality of scenarios such as cloud-based application deployment, application transmission encryption, and a private application.

With reference to the first aspect, in a first possible implementation of the first aspect, determining a data stream class of the current data stream based on the at least one first confidence and the at least one second confidence includes calculating a comprehensive confidence corresponding to a first data stream class based on the first confidence corresponding to the first data stream class, a weight value of the first confidence, the second confidence corresponding to the first data stream class, and a weight value of the second confidence, where the first data stream class is any one of the at least one data stream class, and if the comprehensive confidence corresponding to the first data stream class is greater than a first preset threshold, determining that the data stream class of the current data stream is the first data stream class.

In the foregoing method, confidence weights are separately configured for the content classification model and the behavior classification model in advance based on degrees of impact of the two models on a final classification result (the weight configured for the behavior classification model is a weight of the first confidence, and the weight configured for the content classification model is a weight of the second confidence). Therefore, the comprehensive confidence calculated based on the weights of the two confidences can better reflect an actual class of the current data stream. In addition, the first preset threshold is introduced to measure whether the corresponding data stream class is desirable, so that efficiency and accuracy of determining the data stream class can be improved.

With reference to the first aspect or the foregoing possible implementation of the first aspect, in a second possible implementation of the first aspect, the method further includes, if the comprehensive confidence corresponding to the first data stream class is less than a second preset threshold, sending the feature information of the current data stream and information about the first data stream class to a device, where the second preset threshold is greater than the first preset threshold, receiving first information sent by the device, where the first information is obtained by the device based on the feature information of the current data stream and identification information of the first data stream class, and updating the content classification model based on the first information, to obtain a new content classification model.

With reference to any one of the first aspect or the foregoing possible implementations of the first aspect, in a third possible implementation of the first aspect, the method further includes, if the comprehensive confidence corresponding to the first data stream class is less than a second preset threshold, updating the content classification model based on the feature information of the current data stream and information about the first data stream class, to obtain a new content classification model, where the second preset threshold is greater than the first preset threshold.

In the foregoing method, the content classification model is corrected by using a determining result of the data stream class of the current data stream. Further, the second preset threshold is introduced. When the comprehensive confidence corresponding to the first data stream class is less than the second preset threshold, related information of the current data stream is sent to the device to perform training, to obtain the new content classification model, so that a next determining result is more accurate.

With reference to any one of the first aspect or the foregoing possible implementations of the first aspect, in a fourth possible implementation of the first aspect, updating the content classification model based on the feature information of the current data stream and information about the first data stream class, to obtain a new content classification model includes, if feature information of a first record in a plurality of records is the same as the feature information of the current data stream but a data stream class of the first record is different from the first data stream class, updating the data stream class of the first record to the first data stream class, to obtain a second record, where each of the plurality of records includes feature information and a data stream class, and training a plurality of records including the second record, to obtain the new content classification model.

That is, in a classified record, if feature information of a historical data stream is the same as the feature information of the current data stream but a data stream class of the historical data stream is different from the first data stream class of the current data stream, the data stream class in the record is updated as the first data stream class of the current data stream. This is mainly to adapt to elastic deployment of a cloud resource. For example, a same cloud resource is used for video conferencing in a previous time period, and is used for desktop cloud in a next time period. According to the foregoing method, the data stream class can be updated as the desktop cloud in a timely manner in the next time period, so that the data stream class of the current data stream can still be accurately classified when the cloud resource is elastically deployed.

With reference to any one of the first aspect or the foregoing possible implementations of the first aspect, in a fifth possible implementation of the first aspect, after determining a data stream class of the current data stream based on the at least one first confidence and the at least one second confidence, the method further includes sending information about the data stream class of the current data stream to an operations support system (OSS), where the information about the data stream class of the current data stream is used by the OSS to generate a traffic control policy for the current data stream.

That is, after the data stream class of the current data stream is determined, related information of the data stream class of the current data stream is notified to the OSS system. In this way, the OSS system can generate the traffic control policy for the current data stream based on the data stream class of the current data stream. For example, when the first data stream class of the current data stream is a video stream of the video conferencing, the traffic control policy corresponding to the current data stream is defined as a policy of preferential transmission, that is, when a plurality of data streams is to be transmitted, the current data stream is preferentially transmitted.

With reference to any one of the first aspect or the foregoing possible implementations of the first aspect, in a sixth possible implementation of the first aspect, the packet length includes one or more of an Ethernet frame length, an Internet Protocol (IP) length, a transport protocol length, and a header length in a packet, and a transport protocol includes a Transmission Control Protocol (TCP) and/or a User Datagram Protocol (UDP).

According to a second aspect, an embodiment of this application provides a data stream classification method. The method includes receiving feature information and information about a data stream class that are of a current data stream and that are sent by a device, generating first information based on the feature information and the information about the data stream class that are of the current data stream, and sending the first information to the device to update a content classification model, where the content classification model is used to obtain at least one second confidence corresponding to at least one data stream class, the content classification model is a model obtained based on feature information and a data stream class of one or more historical data streams, the data stream class of the historical data stream is obtained based on a behavior classification model, the behavior classification model is a model obtained based on packet features and data stream classes of a plurality of data stream samples, and the packet feature includes one or more of a packet length, a packet transmission speed, a packet time interval, and a packet direction.

In the foregoing method, the behavior classification model and the content classification model are involved. The behavior classification model is pre-obtained through training based on the packet features and the data stream classes of the plurality of data stream samples, and the content classification model is obtained through training based on the feature information of the data stream and the data stream class that is of the data stream and that is classified by using the behavior model. Therefore, the content classification model is an online learning model. The behavior classification model can classify data stream classes of some basic (or typical) data streams. Some features (such as the packet length and the packet transmission speed) of a data stream of a same class may change in a subsequent transmission process. Therefore, the class of the data stream is classified in other respects (such as a destination address and a protocol type) in combination with an online learning characteristic of the content classification model, to reduce an error in classifying the data stream class of the data stream in the data stream transmission process by using the behavior classification model. As a result, in this application, a classification manner in which the behavior classification model and the content classification model are combined is used to improve accuracy of classifying the data stream class of the data stream and improve classification generality, and can be applied to a plurality of scenarios such as cloud-based application deployment, application transmission encryption, and a private application.

According to a third aspect, an embodiment of this application provides a data stream classification device, including a memory and a processor, where the memory is configured to store a computer program, and the processor invokes the computer program to perform the following operations: obtaining, based on a packet feature of a current data stream and a behavior classification model, at least one first confidence that is of the current data stream and that corresponds to at least one data stream class, where the behavior classification model is a model obtained based on packet features and data stream classes of a plurality of data stream samples, and the packet feature includes one or more of a packet length, a packet transmission speed, a packet time interval, and a packet direction, obtaining, based on feature information of the current data stream and a content classification model, at least one second confidence that is of the current data stream and that corresponds to the at least one data stream class, where the feature information includes a destination address and a protocol type, the content classification model is a model obtained based on feature information and a data stream class of one or more historical data streams, and the data stream class of the historical data stream is obtained based on the behavior classification model, and determining a data stream class of the current data stream based on the at least one first confidence and the at least one second confidence.

In the foregoing method, the behavior classification model and the content classification model are involved. The behavior classification model is pre-obtained through training based on the packet features and the data stream classes of the plurality of data stream samples, and the content classification model is obtained through training based on the feature information of the data stream and the data stream class that is of the data stream and that is classified by using the behavior model. Therefore, the content classification model is an online learning model. The behavior classification model can classify data stream classes of some basic (or typical) data streams. Some features (such as the packet length and the packet transmission speed) of a data stream of a same class may change in a subsequent transmission process. Therefore, the class of the data stream is classified in other respects (such as the destination address and the protocol type) in combination with an online learning characteristic of the content classification model, to reduce an error in classifying the data stream class of the data stream in the data stream transmission process by using the behavior classification model. As a result, in this application, a classification manner in which the behavior classification model and the content classification model are combined is used to improve accuracy of classifying the data stream class of the data stream and improve classification generality, and can be applied to a plurality of scenarios such as cloud-based application deployment, application transmission encryption, and a private application.

With reference to the third aspect, in a first possible implementation of the third aspect, determining a data stream class of the current data stream based on the at least one first confidence and the at least one second confidence includes calculating a comprehensive confidence corresponding to a first data stream class based on the first confidence corresponding to the first data stream class, a weight value of the first confidence, the second confidence corresponding to the first data stream class, and a weight value of the second confidence, where the first data stream class is any one of the at least one data stream class, and if the comprehensive confidence corresponding to the first data stream class is greater than a first preset threshold, determining that the data stream class of the current data stream is the first data stream class.

In the foregoing operations, confidence weights are separately configured for the content classification model and the behavior classification model in advance based on degrees of impact of the two models on a final classification result (the weight configured for the behavior classification model is a weight of the first confidence, and the weight configured for the content classification model is a weight of the second confidence). Therefore, the comprehensive confidence calculated based on the weights of the two confidences can better reflect an actual class of the current data stream. In addition, the first preset threshold is introduced to measure whether the corresponding data stream class is desirable, so that efficiency and accuracy of determining the data stream class can be improved.

With reference to the third aspect or the foregoing possible implementation of the third aspect, in a second possible implementation of the third aspect, the device further includes a transceiver, and the processor is further configured to, if the comprehensive confidence corresponding to the first data stream class is less than a second preset threshold, send the feature information of the current data stream and information about the first data stream class to another device through the transceiver, where the second preset threshold is greater than the first preset threshold, receive, through the transceiver, first information sent by the other device, where the first information is obtained by the other device based on the feature information of the current data stream and identification information of the first data stream class, and update the content classification model based on the first information, to obtain a new content classification model.

With reference to any one of the third aspect or the foregoing possible implementations of the third aspect, in a third possible implementation of the third aspect, the processor is further configured to, if the comprehensive confidence corresponding to the first data stream class is less than a second preset threshold, update the content classification model based on the feature information of the current data stream and information about the first data stream class, to obtain a new content classification model, where the second preset threshold is greater than the first preset threshold.

In the foregoing method, the content classification model is corrected by using a determining result of the data stream class of the current data stream. Further, the second preset threshold is introduced. When the comprehensive confidence corresponding to the first data stream class is less than the second preset threshold, related information of the current data stream is sent to the device to perform training, to obtain the new content classification model, so that a next determining result is more accurate.

With reference to any one of the third aspect or the foregoing possible implementations of the third aspect, in a fourth possible implementation of the third aspect, updating the content classification model based on the feature information of the current data stream and information about the first data stream class, to obtain a new content classification model includes, if feature information of a first record in a plurality of records is the same as the feature information of the current data stream but a data stream class of the first record is different from the first data stream class, updating the data stream class of the first record to the first data stream class, to obtain a second record, where each of the plurality of records includes feature information and a data stream class, and training a plurality of records including the second record, to obtain the new content classification model.

That is, in a classified record, if feature information of a historical data stream is the same as the feature information of the current data stream but a data stream class of the historical data stream is different from the first data stream class of the current data stream, the data stream class in the record is updated as the first data stream class of the current data stream. This is mainly to adapt to elastic deployment of a cloud resource. For example, a same cloud resource is used for video conferencing in a previous time period, and is used for desktop cloud in a next time period. According to the foregoing method, the data stream class can be updated as the desktop cloud in a timely manner in the next time period, so that the data stream class of the current data stream can still be accurately classified when the cloud resource is elastically deployed.

With reference to any one of the third aspect or the foregoing possible implementations of the third aspect, in a fifth possible implementation of the third aspect, the device further includes the transceiver, and the processor is further configured to, after determining the data stream class of the current data stream based on the at least one first confidence and the at least one second confidence, send information about the data stream class of the current data stream to an OSS through the transceiver, where the information about the data stream class of the current data stream is used by the OSS to generate a traffic control policy for the current data stream.

That is, after the data stream class of the current data stream is determined, related information of the data stream class of the current data stream is notified to the OSS system. In this way, the OSS system can generate the traffic control policy for the current data stream based on the data stream class of the current data stream. For example, when the first data stream class of the current data stream is a video stream of the video conferencing, the traffic control policy corresponding to the current data stream is defined as a policy of preferential transmission, that is, when a plurality of data streams is to be transmitted, the current data stream is preferentially transmitted.

With reference to any one of the third aspect or the foregoing possible implementations of the third aspect, in a sixth possible implementation of the third aspect, the packet length includes one or more of an Ethernet frame length, an IP length, a transport protocol length, and a header length in a packet, and a transport protocol includes a TCP and/or a UDP.

According to a fourth aspect, an embodiment of this application provides a data stream classification device, including a memory, a processor, and a transceiver, where the memory is configured to store a computer program, and the processor invokes the computer program to perform the following operations: receiving, through the transceiver, feature information and information about a data stream class that are of a current data stream and that are sent by another device, generating first information based on the feature information and the information about the data stream class that are of the current data stream, and sending the first information to the other device through the transceiver to update a content classification model, where the content classification model is used to obtain at least one second confidence corresponding to at least one data stream class, the content classification model is a model obtained based on feature information and a data stream class of one or more historical data streams, the data stream class of the historical data stream is obtained based on a behavior classification model, the behavior classification model is a model obtained based on packet features and data stream classes of a plurality of data stream samples, and the packet feature includes one or more of a packet length, a packet transmission speed, a packet time interval, and a packet direction.

In the foregoing operations, the behavior classification model and the content classification model are involved. The behavior classification model is pre-obtained through training based on the packet features and the data stream classes of the plurality of data stream samples, and the content classification model is obtained through training based on the feature information of the data stream and the data stream class that is of the data stream and that is classified by using the behavior model. Therefore, the content classification model is an online learning model. The behavior classification model can classify data stream classes of some basic (or typical) data streams. Some features (such as the packet length and the packet transmission speed) of a data stream of a same class may change in a subsequent transmission process. Therefore, the class of the data stream is classified in other respects (such as a destination address and a protocol type) in combination with an online learning characteristic of the content classification model, to reduce an error in classifying the data stream class of the data stream in the data stream transmission process by using the behavior classification model. As a result, in this application, a classification manner in which the behavior classification model and the content classification model are combined is used to improve accuracy of classifying the data stream class of the data stream and improve classification generality, and can be applied to a plurality of scenarios such as cloud-based application deployment, application transmission encryption, and a private application.

According to a fifth aspect, an embodiment of this application provides a data stream classification device. The device includes a first classification unit configured to obtain, based on a packet feature of a current data stream and a behavior classification model, at least one first confidence that is of the current data stream and that corresponds to at least one data stream class, where the behavior classification model is a model obtained based on packet features and data stream classes of a plurality of data stream samples, and the packet feature includes one or more of a packet length, a packet transmission speed, a packet time interval, and a packet direction, a second classification unit configured to obtain, based on feature information of the current data stream and a content classification model, at least one second confidence that is of the current data stream and that corresponds to the at least one data stream class, where the feature information includes a destination address and a protocol type, the content classification model is a model obtained based on feature information and a data stream class of one or more historical data streams, and the data stream class of the historical data stream is obtained based on the behavior classification model, and a determining unit configured to determine a data stream class of the current data stream based on the at least one first confidence and the at least one second confidence.

In the foregoing device, the behavior classification model and the content classification model are involved. The behavior classification model is pre-obtained through training based on the packet features and the data stream classes of the plurality of data stream samples, and the content classification model is obtained through training based on the feature information of the data stream and the data stream class that is of the data stream and that is classified by using the behavior model. Therefore, the content classification model is an online learning model. The behavior classification model can classify data stream classes of some basic (or typical) data streams. Some features (such as the packet length and the packet transmission speed) of a data stream of a same class may change in a subsequent transmission process. Therefore, the class of the data stream is classified in other respects (such as the destination address and the protocol type) in combination with an online learning characteristic of the content classification model, to reduce an error in classifying the data stream class of the data stream in the data stream transmission process by using the behavior classification model. As a result, in this application, a classification manner in which the behavior classification model and the content classification model are combined is used to improve accuracy of classifying the data stream class of the data stream and improve classification generality, and can be applied to a plurality of scenarios such as cloud-based application deployment, application transmission encryption, and a private application.

With reference to the fifth aspect, in a first possible implementation of the fifth aspect, that the determining unit is configured to determine a data stream class of the current data stream based on the at least one first confidence and the at least one second confidence includes calculating a comprehensive confidence corresponding to a first data stream class based on the first confidence corresponding to the first data stream class, a weight value of the first confidence, the second confidence corresponding to the first data stream class, and a weight value of the second confidence, where the first data stream class is any one of the at least one data stream class, and if the comprehensive confidence corresponding to the first data stream class is greater than a first preset threshold, determining that the data stream class of the current data stream is the first data stream class.

In the foregoing device, confidence weights are separately configured for the content classification model and the behavior classification model in advance based on degrees of impact of the two models on a final classification result (the weight configured for the behavior classification model is a weight of the first confidence, and the weight configured for the content classification model is a weight of the second confidence). Therefore, the comprehensive confidence calculated based on the weights of the two confidences can better reflect an actual class of the current data stream. In addition, the first preset threshold is introduced to measure whether the corresponding data stream class is desirable, so that efficiency and accuracy of determining the data stream class can be improved.

With reference to the fifth aspect or the foregoing possible implementation of the fifth aspect, in a second possible implementation of the fifth aspect, the device further includes a first sending unit configured to, when the comprehensive confidence corresponding to the first data stream class is less than a second preset threshold, send the feature information of the current data stream and information about the first data stream class to another device, where the second preset threshold is greater than the first preset threshold, a receiving unit configured to receive first information sent by the other device, where the first information is obtained by the other device based on the feature information of the current data stream and identification information of the first data stream class, and an updating unit configured to update the content classification model based on the first information, to obtain a new content classification model.

With reference to any one of the fifth aspect or the foregoing possible implementations of the fifth aspect, in a third possible implementation of the fifth aspect, the device further includes an updating unit configured to, when the comprehensive confidence corresponding to the first data stream class is less than a second preset threshold, update the content classification model based on the feature information of the current data stream and information about the first data stream class, to obtain a new content classification model, where the second preset threshold is greater than the first preset threshold.

In the foregoing method, the content classification model is corrected by using a determining result of the data stream class of the current data stream. Further, the second preset threshold is introduced. When the comprehensive confidence corresponding to the first data stream class is less than the second preset threshold, related information of the current data stream is sent to the device to perform training, to obtain the new content classification model, so that a next determining result is more accurate.

With reference to any one of the fifth aspect or the foregoing possible implementations of the fifth aspect, in a fourth possible implementation of the fifth aspect, the updating the content classification model based on the feature information of the current data stream and information about the first data stream class, to obtain a new content classification model includes, if feature information of a first record in a plurality of records is the same as the feature information of the current data stream but a data stream class of the first record is different from the first data stream class, updating the data stream class of the first record to the first data stream class, to obtain a second record, where each of the plurality of records includes feature information and a data stream class, and training a plurality of records including the second record, to obtain the new content classification model.

That is, in a classified record, if feature information of a historical data stream is the same as the feature information of the current data stream but a data stream class of the historical data stream is different from the first data stream class of the current data stream, the data stream class in the record is updated as the first data stream class of the current data stream. This is mainly to adapt to elastic deployment of a cloud resource. For example, a same cloud resource is used for video conferencing in a previous time period, and is used for desktop cloud in a next time period. According to the foregoing method, the data stream class can be updated as the desktop cloud in a timely manner in the next time period, so that the data stream class of the current data stream can still be accurately classified when the cloud resource is elastically deployed.

With reference to any one of the fifth aspect or the foregoing possible implementations of the fifth aspect, in a fifth possible implementation of the fifth aspect, the device further includes a second sending unit configured to, after the determining unit determines the data stream class of the current data stream based on the at least one first confidence and the at least one second confidence, send information about the data stream class of the current data stream to an OSS, where the information about the data stream class of the current data stream is used by the OSS to generate a traffic control policy for the current data stream.

That is, after the data stream class of the current data stream is determined, related information of the data stream class of the current data stream is notified to the OSS system. In this way, the OSS system can generate the traffic control policy for the current data stream based on the data stream class of the current data stream. For example, when the first data stream class of the current data stream is a video stream of the video conferencing, the traffic control policy corresponding to the current data stream is defined as a policy of preferential transmission, that is, when a plurality of data streams is to be transmitted, the current data stream is preferentially transmitted.

With reference to any one of the fifth aspect or the foregoing possible implementations of the fifth aspect, in a sixth possible implementation of the fifth aspect, the packet length includes one or more of an Ethernet frame length, an IP length, a transport protocol length, and a header length in a packet, and a transport protocol includes a TCP and/or a UDP.

According to a sixth aspect, an embodiment of this application provides a data stream classification device. The device includes a receiving unit configured to receive feature information and information about a data stream class that are of a current data stream and that are sent by another device, a generation unit configured to generate first information based on the feature information and the information about the data stream class that are of the current data stream, and a sending unit configured to send the first information to the other device to update a content classification model, where the content classification model is used to obtain at least one second confidence corresponding to at least one data stream class, the content classification model is a model obtained based on feature information and a data stream class of one or more historical data streams, the data stream class of the historical data stream is obtained based on a behavior classification model, the behavior classification model is a model obtained based on packet features and data stream classes of a plurality of data stream samples, and the packet feature includes one or more of a packet length, a packet transmission speed, a packet time interval, and a packet direction.

In the foregoing device, the behavior classification model and the content classification model are involved. The behavior classification model is pre-obtained through training based on the packet features and the data stream classes of the plurality of data stream samples, and the content classification model is obtained through training based on the feature information of the data stream and the data stream class that is of the data stream and that is classified by using the behavior model. Therefore, the content classification model is an online learning model. The behavior classification model can classify data stream classes of some basic (or typical) data streams. Some features (such as the packet length and the packet transmission speed) of a data stream of a same class may change in a subsequent transmission process. Therefore, the class of the data stream is classified in other respects (such as a destination address and a protocol type) in combination with an online learning characteristic of the content classification model, to reduce an error in classifying the data stream class of the data stream in the data stream transmission process by using the behavior classification model. As a result, in this application, a classification manner in which the behavior classification model and the content classification model are combined is used to improve accuracy of classifying the data stream class of the data stream and improve classification generality, and can be applied to a plurality of scenarios such as cloud-based application deployment, application transmission encryption, and a private application.

According to a seventh aspect, an embodiment of this application provides a computer-readable storage medium. The computer-readable storage medium stores a computer program, and when the computer program is run on a processor, the method according to any one of the first aspect or the possible implementations of the first aspect is implemented.

According to an eighth aspect, an embodiment of this application provides a computer program product, where the computer program product is stored in a memory, and when the computer program product runs on a processor, the method according to any one of the first aspect or the possible implementations of the first aspect is implemented.

According to a ninth aspect, an embodiment of this application provides a data stream classification system. The system includes a first device and a second device, where the second device is the data stream classification device according to any one of the third aspect or the possible implementations of the third aspect or any one of the fifth aspect or the possible implementations of the fifth aspect, and the first device is the data stream classification device according to any one of the fourth aspect or the possible implementations of the fourth aspect or any one of the sixth aspect or the possible implementations of the sixth aspect.

In the embodiments of this application, the behavior classification model and the content classification model are involved. The behavior classification model is pre-obtained through training based on the packet features and the data stream classes of the plurality of data stream samples, and the content classification model is obtained through training based on the feature information of the data stream and the data stream class that is of the data stream and that is classified by using the behavior model. Therefore, the content classification model is an online learning model. The behavior classification model can classify data stream classes of some basic (or typical) data streams. Some features (such as the packet length and the packet transmission speed) of a data stream of a same class may change in a subsequent transmission process. Therefore, the class of the data stream is classified in other respects (such as the destination address and the protocol type) in combination with the online learning characteristic of the content classification model, to reduce the error in classifying the data stream class of the data stream in the data stream transmission process by using the behavior classification model. As a result, in this application, the classification manner in which the behavior classification model and the content classification model are combined is used to improve the accuracy of classifying the data stream class of the data stream and improve the classification generality, and can be applied to the plurality of scenarios such as the cloud-based application deployment, the application transmission encryption, and the private application.

BRIEF DESCRIPTION OF DRAWINGS

The following describes accompanying drawings used in some embodiments of the present disclosure.

FIG. 5 is a schematic diagram of an example of a data stream record according to an embodiment of the present disclosure;

FIG. 6 is a schematic diagram of an example of a data stream record according to an embodiment of the present disclosure;

FIG. 7 is a schematic diagram of a structure of a second device according to an embodiment of the present disclosure;

FIG. 8 is a schematic diagram of a structure of a first device according to an embodiment of the present disclosure;

DESCRIPTION OF EMBODIMENTS

The following describes embodiments of the present disclosure with reference to accompanying drawings in the embodiments of the present disclosure.

Figure 1:
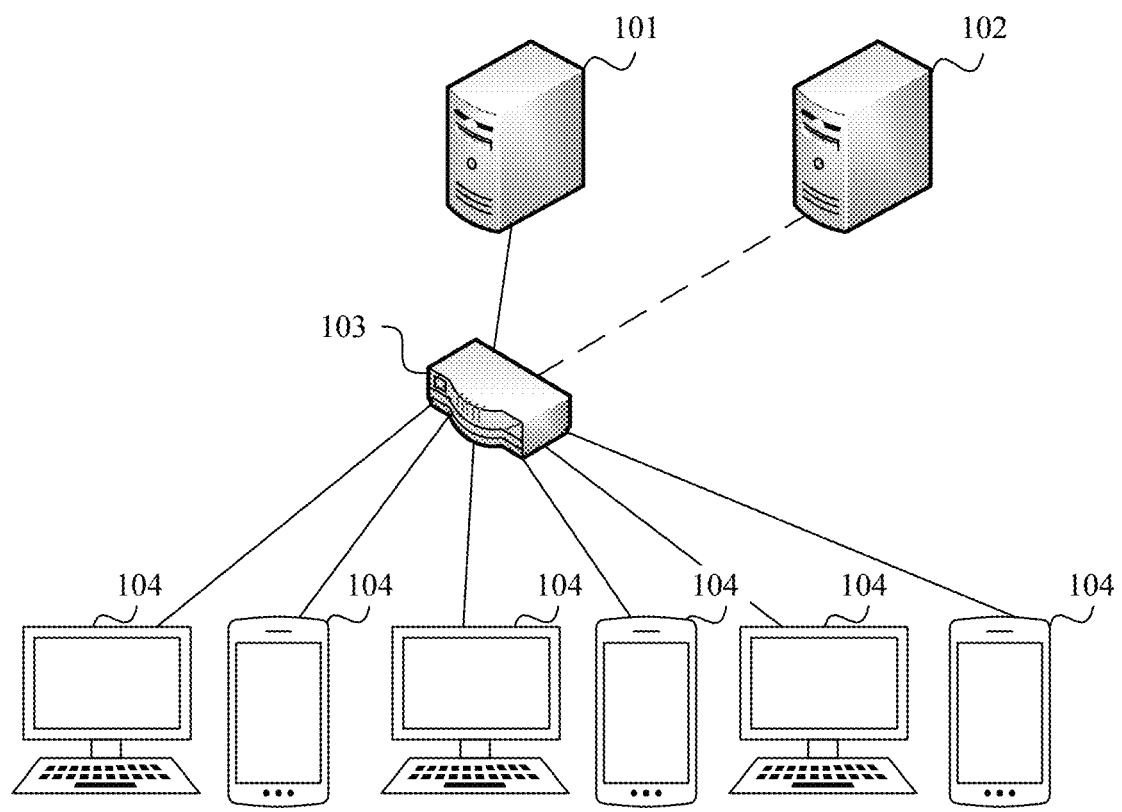
FIG. 1 is a schematic diagram of an architecture of a data stream classification system according to an embodiment of the present disclosure.

FIG. 1 is a schematic diagram of an architecture of a data stream classification system according to an embodiment of the present disclosure. The system includes an OSS 101, a server 102, a forwarding device 103, and a terminal 104. There may be a plurality of terminals 104, and only six terminals are used as an example for illustration in FIG. 1. The terminal 104 is configured to run various applications such as a video conferencing application, a voice conferencing application, and a desktop cloud application. Data stream classes (or application types) of data streams generated by different applications are usually different. In this embodiment of this application, a data stream generated by the terminal 104 needs to be sent to a destination device through the forwarding device 103. The forwarding device may include a router, a switch, or the like. There may be one or more forwarding devices 103. For example, there is one router and three switches. For another example, there is only one switch. For another example, there are three switches. Other examples are not enumerated herein. The server 102 may be one server or a server cluster including a plurality of servers.

The terminal 104 may send a data stream generated by the terminal 104 and the forwarding device 103 may forward a data stream according to a traffic control policy generated by the OSS 101. For example, when it is specified in the traffic control policy that a data stream generated by the video conferencing application has a highest priority, and if the terminal 104 or the forwarding device 103 needs to send a plurality of data streams including the data stream generated by the video conferencing application, the data stream generated by the video conferencing application is preferentially sent. It should be noted that the traffic control policy is generated by the OSS 101 based on a data stream class of a current data stream. In this embodiment of this application, the data stream class that is of the current data stream and that is used by the OSS 101 to generate the traffic control policy is determined by a second device.

Figure 2A:
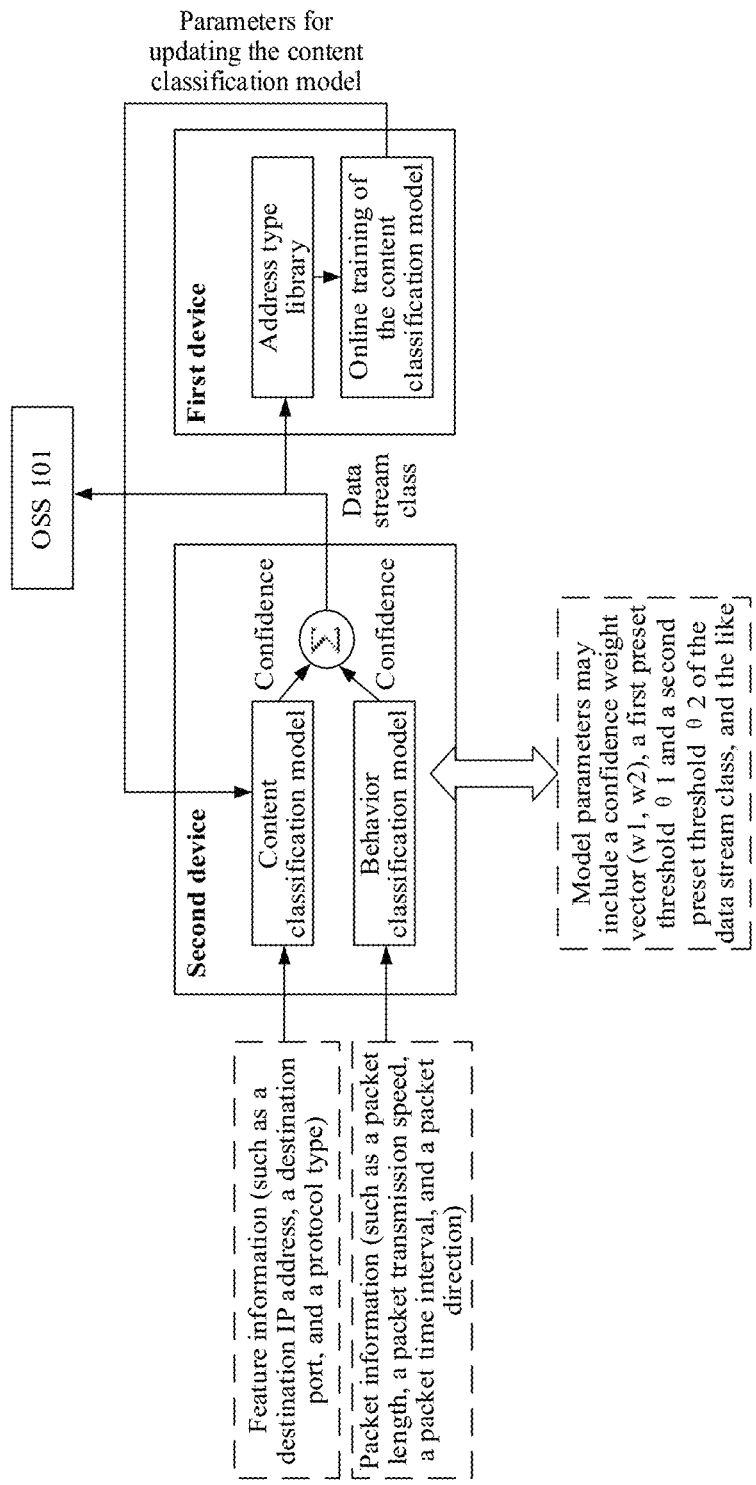
FIG. 2A is a schematic diagram of a scenario of a content classification model and a behavior classification model according to an embodiment of the present disclosure.

As shown in FIG. 2A, a second device needs to use a behavior classification model and a content classification model when determining a data stream class of a current data stream. Model parameters may include but are not limited to a confidence weight vector (w1, w2), and a first preset threshold $\theta 1$ and a second preset threshold $\theta 2$ of the data stream class. The first preset threshold may also be referred to as a classification threshold, and is used to determine whether to classify the data stream class into a specific class. The second preset threshold is also referred to as a model updating threshold, and is used to determine when to update the content classification model. These model parameters are described in more detail in a subsequent method procedure. Inputs used by the content classification model to classify the data stream class of the current data stream may include feature information (such as a destination IP address, a destination port, and a protocol type). Inputs used by the behavior classification model to classify the data stream class of the current data stream may include packet information (such as a packet length, a packet transmission speed, a packet time interval, and a packet direction). The second device obtains a final data stream class based on the confidence weight vector (w1, w2), a confidence obtained by using the content classification model, and a confidence obtained by using the behavior classification model. In this process, if it is determined based on the second preset threshold $\theta 2$ that the content classification model needs to be updated, a parameter for updating the content classification model is obtained.

Optionally, the parameter required for the updating may be obtained by the second device by training related information of some data streams, or may be obtained by a first device by training related information of some data streams, and then sent to the second device.

In this embodiment of this application, the second device may be the OSS 101, the server 102, or the forwarding device 103. In addition, the first device may be the OSS 101, the server 102, or the forwarding device 103. With reference to the foregoing description, the first device and the second device may be a same device, or may be different devices. In addition, when neither the first device nor the second device is the server 102, it may be considered that the server 102 does not exist in the architecture shown in FIG. 1.

Figure 2B:
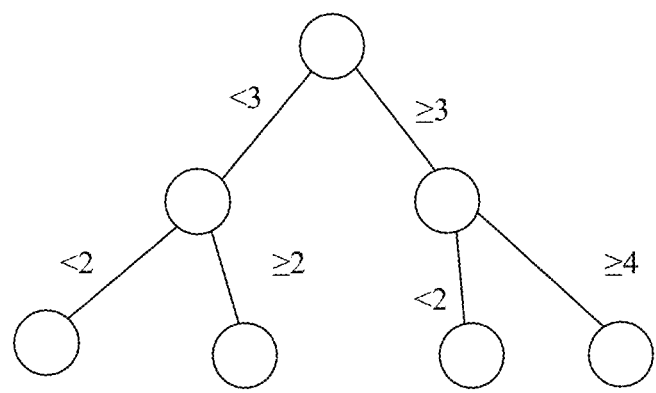
FIG. 2B is a schematic diagram of a structure of a classification model according to an embodiment of the present disclosure.
Figure 2C:
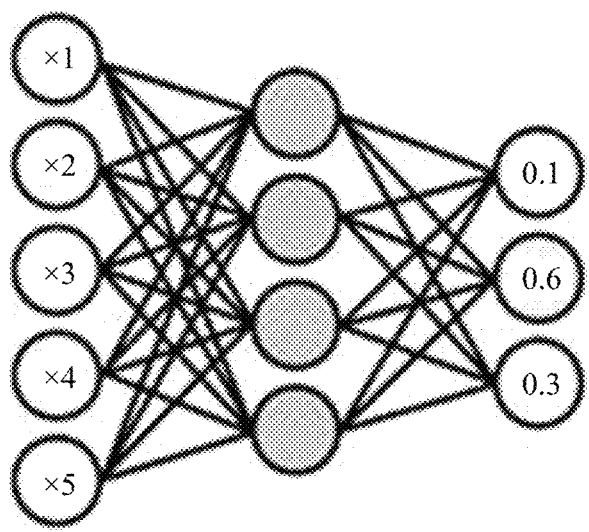
FIG. 2C is a schematic diagram of a structure of a classification model according to an embodiment of the present disclosure.
Figure 2D:
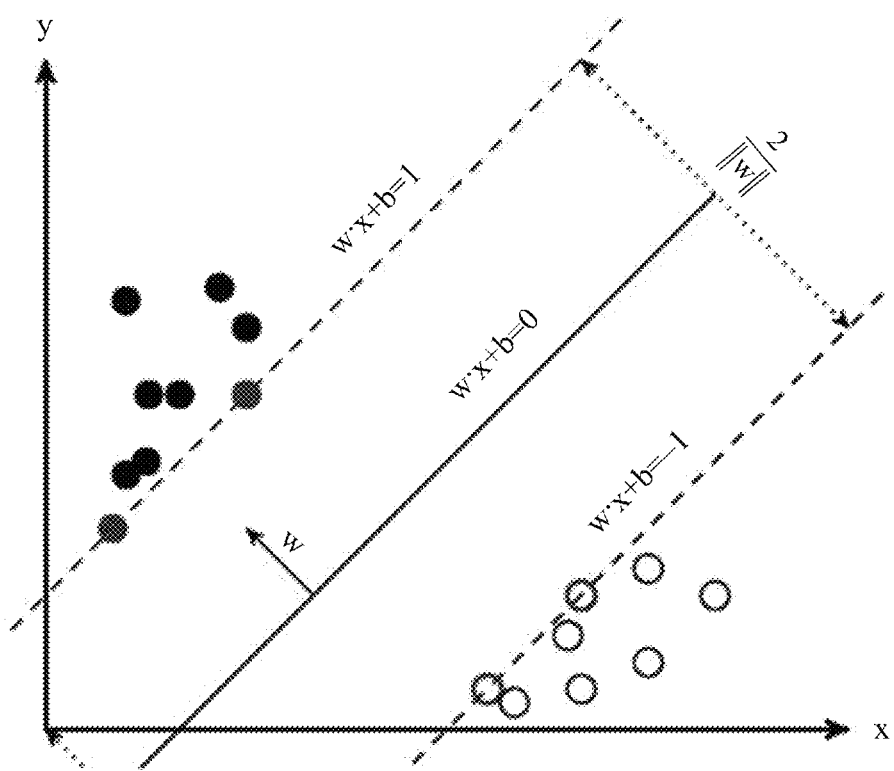
FIG. 2D is a schematic diagram of a structure of a classification model according to an embodiment of the present disclosure.

It should be noted that the content classification model is essentially a classification model. As shown in FIG. 2B, the classification model may be a tree model. As shown in FIG. 2C, the classification model may be a neural network model. As shown in FIG. 2D, the classification model may be a support vector machine (SVM) model. Certainly, the classification model may alternatively be a model in another form. Optionally, the content classification model is obtained through classification of extracted features of input vectors (the feature information such as the destination IP address, a destination port number, and the protocol type). Therefore, the content classification model may classify that data streams with a same destination IP address, a same protocol type, and a same port number belong to a same data stream class, classify that data streams with a same network segment, a same protocol type, and similar port numbers belong to a same data stream class, and classify that TCP traffic whose destination port number is 20 (a well-known File Transfer Protocol (FTP) port number) belongs to a data stream class of downloading.

In addition, some information about the current data stream to be used by the second device to classify the data stream class of the current data stream may be sent by the terminal 104 or another device to the second device, or may be collected by the second device.

Figure 3:
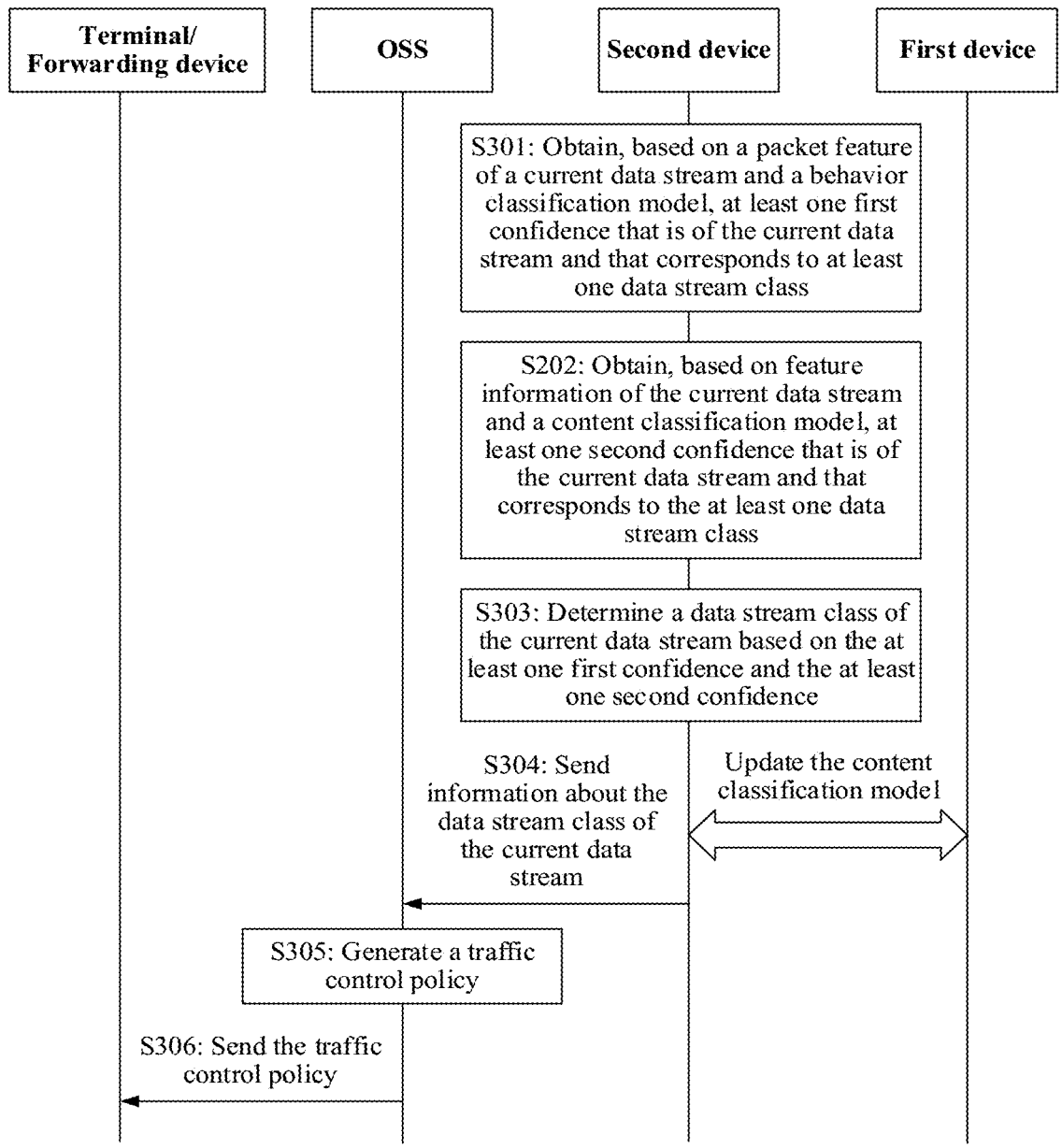
FIG. 3 is a schematic flowchart of a data stream classification method according to an embodiment of the present disclosure.

FIG. 3 shows a data stream classification method according to an embodiment of the present disclosure. The method may be implemented based on the architecture shown in FIG. 1. The method includes but is not limited to the following steps.

Step S301: A second device obtains, based on a packet feature of a current data stream and a behavior classification model, at least one first confidence that is of the current data stream and that corresponds to at least one data stream class.

Further, the behavior classification model is a model obtained based on packet features and data stream classes of a plurality of data stream samples. Optionally, the plurality of data stream samples may be offline samples. In other words, the behavior classification model may be an offline trained model. The plurality of data stream samples may alternatively be relatively typical (or representative) samples selected in advance. For example, packet lengths of packets in a data stream of a video conferencing application are relatively long in most cases, but sometimes are relatively short. By comparison, relatively long packet lengths can better reflect that the current data stream is the data stream of the video conferencing application. Therefore, representative data streams with relatively long packet lengths are preferentially selected as data stream samples of the video conferencing application. Optionally, the data stream classes of the plurality of data stream samples may be manually determined, that is, manually labeled. Because the behavior classification model is the model obtained based on the packet features and the data stream classes of the plurality of data stream samples, the behavior classification model can reflect some relationships between a packet feature and a data stream class of one data stream. Therefore, when the packet feature of the current data stream is input into the behavior classification model, a tendency (or probability) that the current data stream belongs to a specific data stream class or some specific data stream classes can be predicted by using the behavior classification model to some extent, and a parameter that reflects the tendency (or probability) may also be referred to as a confidence.

In this embodiment of this application, the packet feature may include one or more of a packet length, a packet transmission speed, a packet time interval, and a packet direction. Optionally, the packet length includes one or more of an Ethernet frame length, an IP length, a transport protocol length, and a header length in a packet. A transport protocol includes a TCP and/or a UDP. Certainly, in addition to including the features enumerated herein, the packet feature may further include another feature, for example, a largest value, a smallest value, an average value, a variance, or a quantile of the packet length, the packet transmission speed, the packet time interval, and the packet direction. The packet feature may be input into the behavior classification model in a vector form, for example, in a form of (the packet length, the packet transmission speed, the packet time interval). In addition, the data stream class in the embodiments of this application may also be referred to as an application type.

In a first possible case of this embodiment of this application, a confidence that the current data stream belongs to each of N possible data stream classes may be estimated (or predicted), that is, N first confidences of the current data stream that correspond to the N data stream classes are obtained, where N is greater than or equal to 1. For example, if the N data stream classes are a data stream class of the video conferencing, a data stream class of voice conferencing, and a data stream class of desktop cloud, a first confidence that the current data stream belongs to the data stream class of the video conferencing, a first confidence that the current data stream belongs to the data stream class of the voice conferencing, and a first confidence that the current data stream belongs to the data stream class of the desktop cloud need to be estimated by using the behavior classification model. If the N data stream classes are a data stream class of the video conferencing, a first confidence that the current data stream belongs to the data stream class of the video conferencing needs to be estimated by using the behavior classification model.

In a second possible case of this embodiment of this application, only a confidence that the current data stream belongs to a focused data stream class in a plurality of data stream classes is estimated (or predicted), that is, one first confidence that is of the current data stream and that corresponds to one data stream class is obtained. For example, if the plurality of data stream classes are a data stream class of the video conferencing, a data stream class of voice conferencing, and a data stream class of desktop cloud, but only the data stream class of the video conferencing is of great concern in this embodiment of this application, only a first confidence that the current data stream belongs to the data stream class of the video conferencing needs to be estimated by using the behavior classification model.

Step S202: The second device obtains, based on feature information of the current data stream and a content classification model, at least one second confidence that is of the current data stream and that corresponds to the at least one data stream class.

Further, the content classification model is a model obtained based on feature information and a data stream class of one or more historical data streams. Optionally, the one or more historical data streams may be online data streams, namely, one or more data streams continuously generated in a previous time period, and the data stream class of the historical data stream is classified by using the behavior classification model, in other words, the content classification model may be an online trained model. Because the content classification model is the model obtained based on the feature information and the data stream class of the one or more historical data streams, the content classification model can reflect some relationships between feature information and a data stream class of one data stream. Therefore, when the feature information of the current data stream is input into the content classification model, a tendency (or probability) that the current data stream belongs to a specific data stream class or some specific data stream classes can be predicted by using the content classification model to some extent, and a parameter that reflects the tendency (or probability) may also be referred to as a confidence.

In this embodiment of this application, the feature information may include one or more of a destination address, a protocol type, and a port number. The destination address may be an IP address, a destination media access control (MAC) address, or an address in another form. Certainly, the feature information may further include another feature in addition to the features enumerated herein. Further, the feature information herein may be target-specific information, for example, a target IP address or a target port. The feature information may be input into the content classification model in a vector form, and may be in a form of (IP, port, protocol) such as (10.29.74.5, 8443, 6), or may be in a form of (mac, port, protocol) such as (05FA1525EEFF, 8443, 6). Certainly, the feature information may alternatively be in another form, and examples are not enumerated herein one by one.

In a first possible case of this embodiment of this application, a confidence that the current data stream belongs to each of N possible data stream classes may be estimated (or predicted), that is, N second confidences of the current data stream that correspond to the N data stream classes are obtained. For example, if the N data stream classes are the data stream class of the video conferencing, the data stream class of the voice conferencing, and the data stream class of the desktop cloud, a second confidence that the current data stream belongs to the data stream class of the video conferencing, a second confidence that the current data stream belongs to the data stream class of the voice conferencing, and a second confidence that the current data stream belongs to the data stream class of the desktop cloud need to be estimated by using the content classification model. If the N data stream classes are the data stream class of the video conferencing, a second confidence that the current data stream belongs to the data stream class of the video conferencing needs to be estimated by using the content classification model.

In a second possible case of this embodiment of this application, only a confidence that the current data stream belongs to a focused data stream class in a plurality of data stream classes is estimated (or predicted), that is, one second confidence that is of the current data stream and that corresponds to one data stream class is obtained. For example, if the plurality of data stream classes are the data stream class of the video conferencing, the data stream class of the voice conferencing, and the data stream class of the desktop cloud, but only the data stream class of the video conferencing is of great concern in this embodiment of this application, only a second confidence that the current data stream belongs to the data stream class of the video conferencing needs to be estimated by using the content classification model.

Step S303: The second device determines a data stream class of the current data stream based on the at least one first confidence and the at least one second confidence.

Further, because the at least one first confidence can represent a data class tendency of the current data stream to some extent, and the at least one second confidence can also represent the data class tendency of the current data stream to some extent, a more accurate and reliable data stream class tendency can be obtained based on both the at least one first confidence and the at least one second confidence, to obtain the data stream class of the current data stream.

In an optional solution, a data stream class corresponding to a largest comprehensive confidence obtained is determined as the data stream class of the current data stream. For example, a comprehensive confidence of the data stream class of the video conferencing is determined as 0.7 based on the first confidence of the data stream class of the video conferencing and the second confidence of the data stream class of the video conferencing, a comprehensive confidence of the data stream class of the voice conferencing is determined as 0.2 based on the first confidence of the data stream class of the voice conferencing and the second confidence of the data stream class of the voice conferencing, a comprehensive confidence of the data stream class of the desktop cloud is determined as 0.1 based on the first confidence of the data stream class of the desktop cloud and the second confidence of the data stream class of the desktop cloud. Because the comprehensive confidence of the data stream class of the video conferencing is the largest, the data stream class of the current data stream is determined as the data stream class of the video conferencing.

In another optional solution, the determining a data stream class of the current data stream based on the at least one first confidence and the at least one second confidence may include calculating a comprehensive confidence corresponding to a first data stream class based on the first confidence corresponding to the first data stream class, a weight value of the first confidence, the second confidence corresponding to the first data stream class, and a weight value of the second confidence. The first data stream class is any one of the at least one data stream class, in other words, each of the at least one data stream class matches a feature of the first data stream class herein. If the comprehensive confidence corresponding to the first data stream class is greater than a first preset threshold, it is determined that the data stream class of the current data stream is the first data stream class. For example, if a comprehensive confidence corresponding to the data stream class of the video conferencing is greater than the first preset threshold, it is determined that the data stream class of the current data stream is the data stream class of the video conferencing. If a comprehensive confidence corresponding to the data stream class of the desktop cloud is greater than the first preset threshold, it is determined that the data stream class of the current data stream is the data stream class of the desktop cloud.

For example, it is assumed that a confidence weight vector (w1, w2) is (0.4, 0.6), that is, a weight of the first confidence (which may also be considered as a weight of the behavior classification model) is 0.6, and a weight of the second confidence (which may also be considered as a weight of the content classification model) is 0.4, and the first preset threshold θ1 of the data stream class is equal to 0.5. At the beginning of performing data stream classification by the second device, because the content classification model is not fully trained, the behavior classification model can classify a data stream class of an input data stream, but the content classification model cannot classify a data stream class of input stream data. Therefore, at the beginning, a confidence corresponding to any data stream class classified by the content classification model is 0.

Figure 4:
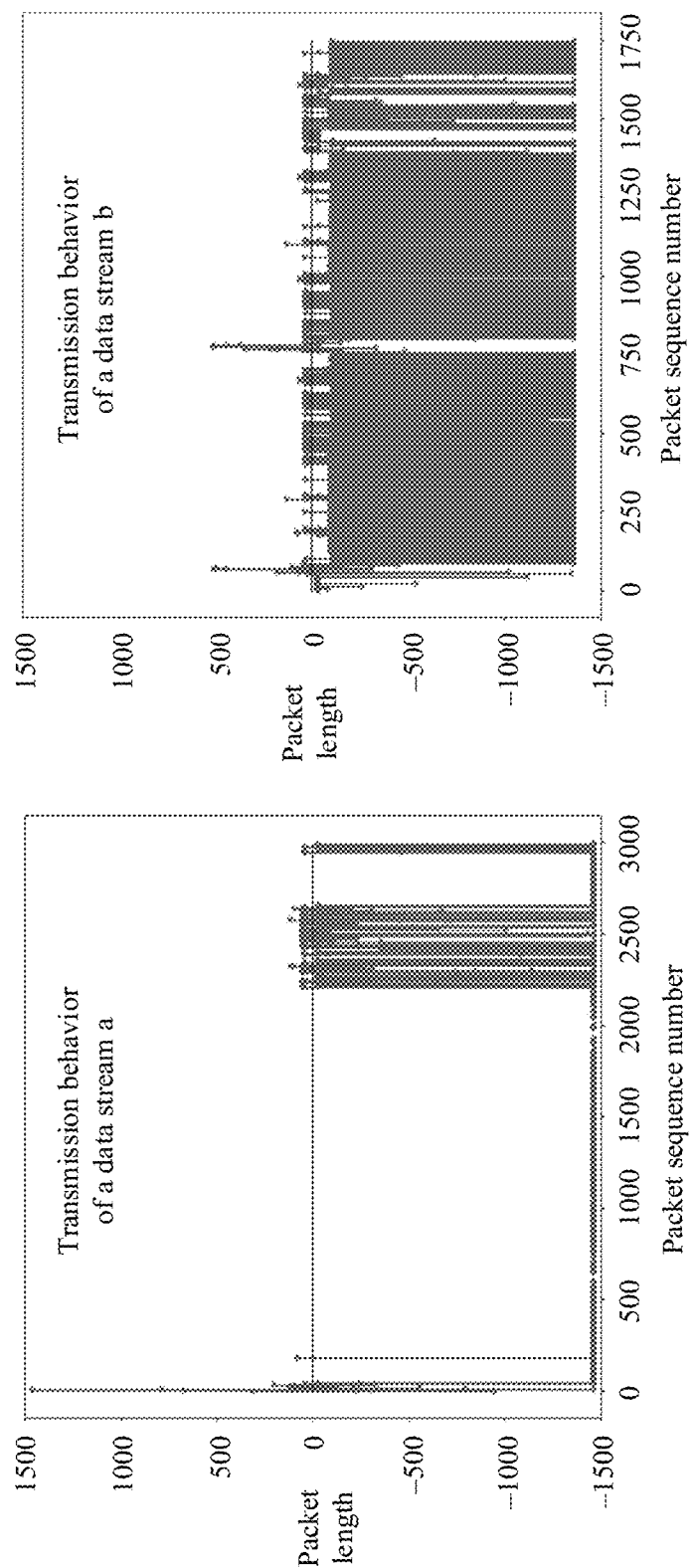
FIG. 4 is a schematic diagram of a scenario of a data stream a and a data stream b according to an embodiment of the present disclosure.

It is assumed that there are two desktop cloud data streams. As shown in FIG. 4, a horizontal axis represents a data stream sequence number, a vertical axis represents a packet length, a packet whose packet length is greater than 0 is an uplink packet, a packet whose packet length is less than 0 is a downlink packet. Both a data stream a and a data stream b belong to the data stream class of the desktop cloud. The data stream b includes the uplink packet, and can better represent a characteristic of a desktop cloud scenario. Therefore, it is considered that a packet behavior of the data stream b is a typical behavior. There is no uplink packet in the data stream a for a long time period, and it cannot clearly indicate that the data stream a is in the desktop cloud scenario. Therefore, it is considered that a packet behavior of the data stream a is an atypical behavior. The behavior classification model is usually obtained by training data streams with typical behaviors. Therefore, the behavior classification model can classify a data stream class of the data stream b, but cannot classify a data stream class of the data stream a. Feature information of the data stream a and the data stream b is as follows.

A protocol type of the data stream a is the TCP, a destination IP address of the data stream a is 10.129.74.5, and a destination port number of the data stream a is 8443.

A protocol type of the data stream b is the TCP, a destination IP address of the data stream b is 10.129.56.39, and a destination port number of the data stream b is 443.

In this case, for the data stream a, second confidences of classifying, by using the content classification model, that the data stream a belongs to the data stream class of the desktop cloud, the data stream class of the voice conferencing, and the data stream class of the video conferencing are all 0, and first confidences of classifying, by using the behavior classification model based on a packet feature, that the data stream a belongs to the data stream class of the desktop cloud, the data stream class of the voice conferencing, and the data stream class of the video conferencing are respectively 0.5, 0, and 0. Therefore, comprehensive confidences corresponding to the three data stream classes are as follows:

Desktop cloud: 0x0.4+0.5x0.6=0.3, which is less than θ1. Therefore, the current data stream does not belong to the data stream class of the desktop cloud.

Voice conferencing: 0x0.4+0x0.6=0, which is less than θ1. Therefore, the current data stream does not belong to the data stream class of the voice conferencing.

Video conferencing: 0x0.4+0x0.6=0, which is less than θ1. Therefore, the current data stream does not belong to the data stream class of the video conferencing.

In this case, for the data stream b, second confidences of classifying, by using the content classification model, that the data stream b belongs to the data stream class of the desktop cloud, the data stream class of the voice conferencing, and the data stream class of the video conferencing are all 0, and first confidences of classifying, by using the behavior classification model based on a packet feature, that the data stream b belongs to the data stream class of the desktop cloud, the data stream class of the voice conferencing, and the data stream class of the video conferencing are respectively 0.9, 0, and 0. Therefore, comprehensive confidences corresponding to the three data stream classes are as follows:

Desktop cloud: 0x0.4+0.9x0.6=0.54, which is greater than θ1. Therefore, the current data stream belongs to the data stream class of the desktop cloud.

Voice conferencing: 0x0.4+0x0.6=0, which is less than θ1. Therefore, the current data stream does not belong to the data stream class of the voice conferencing.

Video conferencing: 0x0.4+0x0.6=0, which is less than θ1. Therefore, the current data stream does not belong to the data stream class of the video conferencing.

In this embodiment of this application, the content classification model may be further updated. The following provides two different update schemes.

Scheme 1: If the comprehensive confidence corresponding to the first data stream class is greater than the first preset threshold and less than a second preset threshold θ2, the second device sends the feature information of the current data stream and information about the first data stream class to a first device, where the second preset threshold is greater than the first preset threshold. For example, for the data stream a, the comprehensive confidence 0.3 corresponding to the data stream class of the desktop cloud is not within a range (θ1, θ2). Therefore, the feature information of the current data stream and information about the data stream class of the desktop cloud do not need to be sent to the first device. For another example, for the data stream b, the comprehensive confidence 0.54 corresponding to the data stream class of the desktop cloud is not within a range (θ1, θ2). Therefore, the feature information (for example, the destination IP address 10.129.56.39, the destination port number 443, and the protocol type TCP) of the current data stream and information (information such as a name and an identifier) about the data stream class of the desktop cloud need to be sent to the first device.

Correspondingly, the first device receives the feature information of the current data stream and the information about the first data stream class that are sent by the second device, that is, one data stream record is added to the first device. As shown in FIG. 5, a record for the data stream b is added. Then, the first device obtains first information, for example, some parameters that affect confidence calculation, based on the feature information of the current data stream and the information about the first data stream class. Optionally, the first information is a model file, and therefore may be transmitted in a model file form. Commonly, an AI model file of the open source Keras library is an h5 file/json file, and an AI model file of the open source Sklearn library is a pkl/m file. These files are binary and are used to store a structure of a model and a weight of the model.

Next, the second device receives the first information sent by the first device, and then updates the content classification model based on the first information, to obtain a new content classification model. In the record for the data stream b, the destination IP address 10.129.56.39, the destination port number 443, and the protocol type TCP all correspond to the data stream class of the desktop cloud. Therefore, when the updated content classification model estimates the input data stream b again, an estimated second confidence corresponding to the data stream class of the desktop cloud is 1. Optionally, because there are similarities between the feature information of the data stream a and the feature information of the data stream b, for example, the destination IP addresses are in a same network segment, the port numbers are similar, and the protocol types are similar, when the updated content classification model estimates the input data stream a again, an estimation result is closer to an estimation result for the data stream b. For example, an estimated second confidence corresponding to the data stream class of the desktop cloud may be 0.6.

A procedure for estimating the data stream classes of the data stream a and the data stream b that subsequently occur in a network is as follows.

The confidence weight vector (w1, w2), the first preset threshold θ1, and the second preset threshold θ2 remain unchanged.

In this case, for the data stream a, second confidences of classifying, by using the content classification model, that the data stream a belongs to the data stream class of the desktop cloud, the data stream class of the voice conferencing, and the data stream class of the video conferencing are respectively 0.6, 0, and 0, and first confidences of classifying, by using the behavior classification model based on the packet feature, that the data stream a belongs to the data stream class of the desktop cloud, the data stream class of the voice conferencing, and the data stream class of the video conferencing are respectively 0.5, 0, and 0. Therefore, comprehensive confidences corresponding to the three data stream classes are as follows:

Desktop cloud: 0.6×0.4+0.5×0.6=0.54, which is greater than θ1. Therefore, the current data stream belongs to the data stream class of the desktop cloud.

Voice conferencing: 0×0.4+0×0.6=0, which is less than θ1. Therefore, the current data stream does not belong to the data stream class of the voice conferencing.

Video conferencing: 0×0.4+0×0.6=0, which is less than θ1. Therefore, the current data stream does not belong to the data stream class of the video conferencing.

Because the second confidence 0.54 of classifying that the data stream a belongs to the data stream class of the desktop cloud is within the range (θ1, θ2), the feature information of the current data stream and the information about the data stream class of the desktop cloud need to be sent to the first device, to subsequently update the content classification model (an update principle has been described above and is not described here again).

In this case, for the data stream b, second confidences of classifying, by using the content classification model, that the data stream b belongs to the data stream class of the desktop cloud, the data stream class of the voice conferencing, and the data stream class of the video conferencing are respectively 1, 0, and 0, and first confidences of classifying, by using the behavior classification model based on the packet feature, that the data stream b belongs to the data stream class of the desktop cloud, the data stream class of the voice conferencing, and the data stream class of the video conferencing are respectively 0.9, 0, and 0. Therefore, comprehensive confidences corresponding to the three data stream classes are as follows:

Desktop cloud: 1×0.4+0.9×0.6=0.94, which is greater than θ1. Therefore, the current data stream belongs to the data stream class of the desktop cloud.

Voice conferencing: 0×0.4+0×0.6=0, which is less than θ1. Therefore, the current data stream does not belong to the data stream class of the voice conferencing.

Video conferencing: 0×0.4+0×0.6=0, which is less than θ1. Therefore, the current data stream does not belong to the data stream class of the video conferencing.

Because the second confidence 0.94 of classifying that the data stream b belongs to the data stream class of the desktop cloud is not within the range (θ1, θ2), the feature information of the current data stream and the information about the data stream class of the desktop cloud do not need to be sent to the first device.

A cloud-based elastic deployment scenario exists in the network. For example, a cloud resource whose destination IP address is 10.129.56.39, destination port number is 443, and protocol type is the TCP changes from serving the desktop cloud to serving the video conferencing. In this scenario, that the first device obtains first information based on the feature information of the current data stream and the information about the first data stream class may include, if feature information of a first record in a plurality of records is the same as the feature information of the current data stream but a data stream class of the first record is different from the first data stream class, updating the data stream class of the first record to the first data stream class, to obtain a second record, where each of the plurality of records includes feature information and a data stream class, and then training a plurality of records including the second record, to obtain the first information.

For example, a protocol type of a data stream c is the TCP, a destination IP address of the data stream c is 10.129.56.39, and a destination port number of the data stream c is 443.

In this case, for the data stream c, second confidences of classifying, by using the content classification model, that the data stream c belongs to the data stream class of the desktop cloud, the data stream class of the voice conferencing, and the data stream class of the video conferencing are respectively 1, 0, and 0, and first confidences of classifying, by using the behavior classification model based on a packet feature, that the data stream c belongs to the data stream class of the desktop cloud, the data stream class of the voice conferencing, and the data stream class of the video conferencing are respectively 0, 0, and 0.9. Therefore, comprehensive confidences corresponding to the three data stream classes are as follows:

Desktop cloud: 1×0.4+0×0.6=0.4, which is less than θ1. Therefore, the current data stream does not belong to the data stream class of the desktop cloud.

Voice conferencing: 0×0.4+0×0.6=0, which is less than θ1. Therefore, the current data stream does not belong to the data stream class of the voice conferencing.

Video conferencing: 0×0.4+0.9×0.6=0.54, which is greater than θ1. Therefore, the current data stream belongs to the data stream class of the video conferencing.

Because the second confidence 0.54 of classifying that the data stream c belongs to the data stream class of the video conferencing is within the range (θ1, θ2), the feature information of the current data stream and the information about the data stream class of the desktop cloud need to be sent to the first device. Correspondingly, the first device receives the feature information of the current data stream and the information about the first data stream class that are sent by the second device, that is, one data stream record is added to the first device. As shown in FIG. 6, a record for the data stream c is added.

In comparison of FIG. 6 and FIG. 5, it can be learned that, for the record for the data stream b and the record for the data stream c, the data stream classes (namely, application types) are different but the feature information (such as the destination IP address, the destination port number, and the protocol type) is the same. Therefore, an existing record is modified, so that a data stream class corresponding to all the protocol type TCP, the destination IP address 10.129.56.39, and the destination port number 443 is the data stream class of the video conferencing instead of the data stream class corresponding to the desktop cloud, where an unmodified record is the first record, and a modified record is the second record.

It may be understood that, after the first record is updated to be the second record, and the content classification model is updated based on the first information obtained by training the second record, and when the data stream c is input into the updated content classification model again, a second confidence of classifying that the data stream c belongs to the data stream class of the desktop cloud is 0, and a second confidence of classifying that the data stream c belongs to the data stream class of the video conferencing is 1.

Scheme 2: If the comprehensive confidence corresponding to the first data stream class is less than a second preset threshold, the second device does not need to send the feature information of the current data stream and information about the first data stream class to a first device, but updates the content classification model based on the feature information of the current data stream and the information about the first data stream class, to obtain a new content classification model, where the second preset threshold is greater than the first preset threshold. Optionally, if feature information of a first record in a plurality of records is the same as the feature information of the current data stream but a data stream class of the first record is different from the first data stream class, the second device updates the data stream class of the first record to the first data stream class, to obtain a second record, where each of the plurality of records includes feature information and a data stream class, and trains a plurality of records including the second record, to obtain the new content classification model. For ease of understanding, for a specific principle, refer to the foregoing solution 1, and the second device replaces the first device to perform the operations in the solution 1.

Step S304: The second device sends information about the data stream class of the current data stream to the OSS.

Further, the second device may send the information about the data stream class of the current data stream to the OSS each time the data stream class of the current data stream is determined. For example, when a data stream class of the data stream a is generated for the first time, information about the data stream class of the data stream a is sent to the OSS. When a data stream class of the data stream b is generated for the first time, information about the data stream class of the data stream b is sent to the OSS. When a data stream class of the data stream a is generated for the second time, information about the data stream class of the data stream a is sent to the OSS. When a data stream class of the data stream b is generated for the second time, information about the data stream class of the data stream b is sent to the OSS. When a data stream class of the data stream c is generated, information about the data stream class of the data stream c is sent to the OSS. It may be understood that, if the second device is the OSS, step S304 does not need to be performed.

Step S305: The OSS generates a traffic control policy for the current data stream based on the information about the data stream class of the current data stream. For example, if the information about the data stream class of the current data stream indicates that the current data stream belongs to the data stream class of the video desktop cloud or the data stream class of the video conferencing, the current data stream is defined as high-priority QoS.

Step S306: The OSS sends the traffic control policy to the forwarding device or the terminal.

Further, the forwarding device 103 may be a router, a switch, or the like, and the terminal 104 is a device that outputs the foregoing current data stream. If the forwarding device or the terminal learns, according to the traffic control policy, that the current data stream is the high-priority QoS, when finding that a plurality of data streams is to be sent, the forwarding device or the terminal preferentially sends the current data stream configured to be high-priority.

In the method described in FIG. 3, the behavior classification model and the content classification model are involved. The behavior classification model is pre-obtained through training based on the packet features and the data stream classes of the plurality of data stream samples, and the content classification model is obtained through training based on the feature information of the data stream and the data stream class that is of the data stream and that is classified by using the behavior model. Therefore, the content classification model is an online learning model. The behavior classification model can classify data stream classes of some basic (or typical) data streams. Some features (such as the packet length and the packet transmission speed) of a data stream of a same class may change in a subsequent transmission process. Therefore, the class of the data stream is classified in other respects (such as the destination address and the protocol type) in combination with an online learning characteristic of the content classification model, to reduce an error in classifying the data stream class of the data stream in the data stream transmission process by using the behavior classification model. As a result, in this application, a classification manner in which the behavior classification model and the content classification model are combined is used to improve accuracy of classifying the data stream class of the data stream and improve classification generality, and can be applied to a plurality of scenarios such as cloud-based application deployment, application transmission encryption, and a private application.

The foregoing describes in detail the method in the embodiments of the present disclosure, and the following provides an apparatus in the embodiments of the present disclosure.

FIG. 7 is a schematic diagram of a structure of a data stream classification device 70 according to an embodiment of the present disclosure. The device 70 may be the second device in the method embodiment shown in FIG. 3, and the device 70 may include a first classification unit 701, a second classification unit 702, and a determining unit 703. Detailed description of the units is as follows.

The first classification unit 701 is configured to obtain, based on a packet feature of a current data stream and a behavior classification model, at least one first confidence that is of the current data stream and that corresponds to at least one data stream class, where the behavior classification model is a model obtained based on packet features and data stream classes of a plurality of data stream samples, and the packet feature includes one or more of a packet length, a packet transmission speed, a packet time interval, and a packet direction.

The second classification unit 702 is configured to obtain, based on feature information of the current data stream and a content classification model, at least one second confidence that is of the current data stream and that corresponds to the at least one data stream class, where the feature information includes a destination address and a protocol type, the content classification model is a model obtained based on feature information and a data stream class of one or more historical data streams, and the data stream class of the historical data stream is obtained based on the behavior classification model.

The determining unit 703 is configured to determine a data stream class of the current data stream based on the at least one first confidence and the at least one second confidence.

In the foregoing device, the behavior classification model and the content classification model are involved. The behavior classification model is pre-obtained through training based on the packet features and the data stream classes of the plurality of data stream samples, and the content classification model is obtained through training based on the feature information of the data stream and the data stream class that is of the data stream and that is classified by using the behavior model. Therefore, the content classification model is an online learning model. The behavior classification model can classify data stream classes of some basic (or typical) data streams. Some features (such as the packet length and the packet transmission speed) of a data stream of a same class may change in a subsequent transmission process. Therefore, the class of the data stream is classified in other respects (such as the destination address and the protocol type) in combination with an online learning characteristic of the content classification model, to reduce an error in classifying the data stream class of the data stream in the data stream transmission process by using the behavior classification model. As a result, in this application, a classification manner in which the behavior classification model and the content classification model are combined is used to improve accuracy of classifying the data stream class of the data stream and improve classification generality, and can be applied to a plurality of scenarios such as cloud-based application deployment, application transmission encryption, and a private application.

In a possible implementation, that the determining unit 703 is configured to determine a data stream class of the current data stream based on the at least one first confidence and the at least one second confidence includes calculating a comprehensive confidence corresponding to a first data stream class based on the first confidence corresponding to the first data stream class, a weight value of the first confidence, the second confidence corresponding to the first data stream class, and a weight value of the second confidence, where the first data stream class is any one of the at least one data stream class, and if the comprehensive confidence corresponding to the first data stream class is greater than a first preset threshold, determining that the data stream class of the current data stream is the first data stream class.

In the foregoing device, confidence weights are separately configured for the content classification model and the behavior classification model in advance based on degrees of impact of the two models on a final classification result (the weight configured for the behavior classification model is a weight of the first confidence, and the weight configured for the content classification model is a weight of the second confidence). Therefore, the comprehensive confidence calculated based on the weights of the two confidences can better reflect an actual class of the current data stream. In addition, the first preset threshold is introduced to measure whether the corresponding data stream class is desirable, so that efficiency and accuracy of determining the data stream class can be improved.

In another possible implementation, the device 70 further includes a first sending unit configured to, when the comprehensive confidence corresponding to the first data stream class is less than a second preset threshold, send the feature information of the current data stream and information about the first data stream class to another device (for example, the first device in the method embodiment shown in FIG. 3), where the second preset threshold is greater than the first preset threshold, a receiving unit configured to receive first information sent by the other device (for example, the first device in the method embodiment shown in FIG. 3), where the first information is obtained by the other device (for example, the first device in the method embodiment shown in FIG. 3) based on the feature information of the current data stream and identification information of the first data stream class, and an updating unit configured to update the content classification model based on the first information, to obtain a new content classification model.

In another possible implementation, the device 70 further includes an updating unit configured to, when the comprehensive confidence corresponding to the first data stream class is less than a second preset threshold, update the content classification model based on the feature information of the current data stream and information about the first data stream class, to obtain a new content classification model, where the second preset threshold is greater than the first preset threshold.

In the foregoing method, the content classification model is corrected by using a determining result of the data stream class of the current data stream. Further, the second preset threshold is introduced. When the comprehensive confidence corresponding to the first data stream class is less than the second preset threshold, related information of the current data stream is sent to the device to perform training, to obtain the new content classification model, so that a next determining result is more accurate.

In another possible implementation, the updating the content classification model based on the feature information of the current data stream and information about the first data stream class, to obtain a new content classification model includes, if feature information of a first record in a plurality of records is the same as the feature information of the current data stream but a data stream class of the first record is different from the first data stream class, updating the data stream class of the first record to the first data stream class, to obtain a second record, where each of the plurality of records includes feature information and a data stream class, and training a plurality of records including the second record, to obtain the new content classification model.

That is, in a classified record, if feature information of a historical data stream is the same as the feature information of the current data stream but a data stream class of the historical data stream is different from the first data stream class of the current data stream, the data stream class in the record is updated as the first data stream class of the current data stream. This is mainly to adapt to elastic deployment of a cloud resource. For example, a same cloud resource is used for video conferencing in a previous time period, and is used for desktop cloud in a next time period. According to the foregoing method, the data stream class can be updated as the desktop cloud in a timely manner in the next time period, so that the data stream class of the current data stream can still be accurately classified when the cloud resource is elastically deployed.

In another possible implementation, the device 70 further includes a second sending unit configured to, after the determining unit determines the data stream class of the current data stream based on the at least one first confidence and the at least one second confidence, send information about the data stream class of the current data stream to an OSS, where the information about the data stream class of the current data stream is used by the OSS to generate a traffic control policy for the current data stream.

That is, after the data stream class of the current data stream is determined, related information of the data stream class of the current data stream is notified to the OSS system. In this way, the OSS system can generate the traffic control policy for the current data stream based on the data stream class of the current data stream. For example, when the first data stream class of the current data stream is a video stream of the video conferencing, the traffic control policy corresponding to the current data stream is defined as a policy of preferential transmission, that is, when a plurality of data streams is to be transmitted, the current data stream is preferentially transmitted.

In another possible implementation, the packet length includes one or more of an Ethernet frame length, an IP length, a transport protocol length, and a header length in a packet, and a transport protocol includes a TCP and/or a UDP.

It should be noted that for implementation of the units, refer to the corresponding description in the method embodiment shown in FIG. 3.

FIG. 8 is a schematic diagram of a structure of a data stream classification device 80 according to an embodiment of the present disclosure. The device 80 may be the first device in the method embodiment shown in FIG. 3, and the device 80 may include a receiving unit 801, a generation unit 802, and a sending unit 803. Detailed description of the units is as follows.

The receiving unit 801 is configured to receive feature information and information about a data stream class that are of a current data stream and that are sent by another device (for example, the second device in the method embodiment shown in FIG. 3).

The generation unit 802 is configured to generate first information based on the feature information and the information about the data stream class that are of the current data stream.

The sending unit 803 is configured to send the first information to the other device (for example, the second device in the method embodiment shown in FIG. 3) to update a content classification model, where the content classification model is used to obtain at least one second confidence corresponding to at least one data stream class, the content classification model is a model obtained based on feature information and a data stream class of one or more historical data streams, the data stream class of the historical data stream is obtained based on a behavior classification model, the behavior classification model is a model obtained based on packet features and data stream classes of a plurality of data stream samples, and the packet feature includes one or more of a packet length, a packet transmission speed, a packet time interval, and a packet direction.

In the device 80, the behavior classification model and the content classification model are involved. The behavior classification model is pre-obtained through training based on the packet features and the data stream classes of the plurality of data stream samples, and the content classification model is obtained through training based on the feature information of the data stream and the data stream class that is of the data stream and that is classified by using the behavior model. Therefore, the content classification model is an online learning model. The behavior classification model can classify data stream classes of some basic (or typical) data streams. Some features (such as the packet length and the packet transmission speed) of a data stream of a same class may change in a subsequent transmission process. Therefore, the class of the data stream is classified in other respects (such as a destination address and a protocol type) in combination with an online learning characteristic of the content classification model, to reduce an error in classifying the data stream class of the data stream in the data stream transmission process by using the behavior classification model. As a result, in this application, a classification manner in which the behavior classification model and the content classification model are combined is used to improve accuracy of classifying the data stream class of the data stream and improve classification generality, and can be applied to a plurality of scenarios such as cloud-based application deployment, application transmission encryption, and a private application.

It should be noted that for implementation of the units, refer to the corresponding description in the method embodiment shown in FIG. 3.

Figure 9:
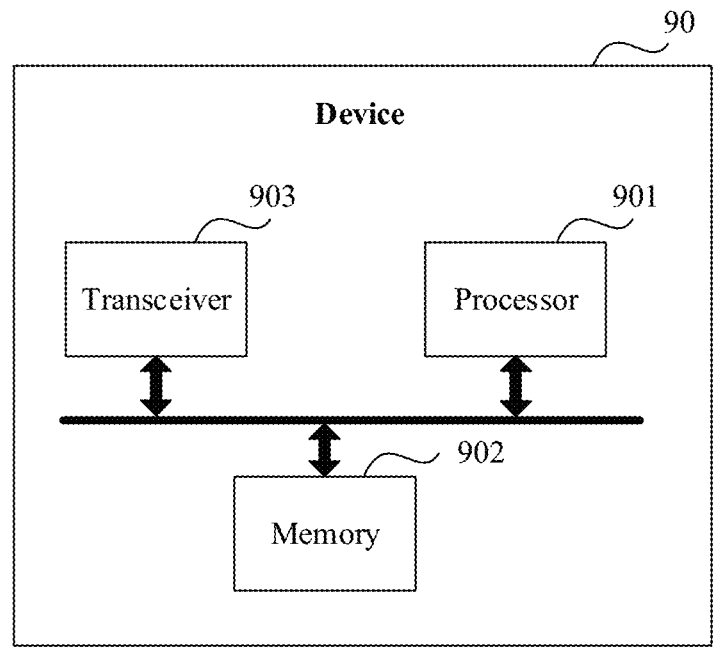
FIG. 9 is a schematic diagram of a structure of another second device according to an embodiment of the present disclosure.

FIG. 9 shows a device 90 according to an embodiment of the present disclosure. The device 90 may be the second device in the method embodiment shown in FIG. 3. The device 90 includes a processor 901, a memory 902, and a transceiver 903. The processor 901, the memory 902, and the transceiver 903 are connected to each other via a bus.

The memory 902 includes, but is not limited to, a random-access memory (RAM), a read-only memory (ROM), an erasable programmable ROM (EPROM), or a compact disc (CD) ROM (CD-ROM). The memory 902 is configured to store related computer programs and data. The transceiver 903 is configured to receive and send data.

The processor 901 may be one or more central processing units (CPUs). When the processor 901 is one CPU, the CPU may be a single-core CPU, or may be a multi-core CPU.

The processor 901 reads computer program code stored in the memory 902, to perform the following operations: obtaining, based on a packet feature of a current data stream and a behavior classification model, at least one first confidence that is of the current data stream and that corresponds to at least one data stream class, where the behavior classification model is a model obtained based on packet features and data stream classes of a plurality of data stream samples, and the packet feature includes one or more of a packet length, a packet transmission speed, a packet time interval, and a packet direction, obtaining, based on feature information of the current data stream and a content classification model, at least one second confidence that is of the current data stream and that corresponds to the at least one data stream class, where the feature information includes a destination address and a protocol type, the content classification model is a model obtained based on feature information and a data stream class of one or more historical data streams, and the data stream class of the historical data stream is obtained based on the behavior classification model, and determining a data stream class of the current data stream based on the at least one first confidence and the at least one second confidence.

In the foregoing operations, the behavior classification model and the content classification model are involved. The behavior classification model is pre-obtained through training based on the packet features and the data stream classes of the plurality of data stream samples, and the content classification model is obtained through training based on the feature information of the data stream and the data stream class that is of the data stream and that is classified by using the behavior model. Therefore, the content classification model is an online learning model. The behavior classification model can classify data stream classes of some basic (or typical) data streams. Some features (such as the packet length and the packet transmission speed) of a data stream of a same class may change in a subsequent transmission process. Therefore, the class of the data stream is classified in other respects (such as the destination address and the protocol type) in combination with an online learning characteristic of the content classification model, to reduce an error in classifying the data stream class of the data stream in the data stream transmission process by using the behavior classification model. As a result, in this application, a classification manner in which the behavior classification model and the content classification model are combined is used to improve accuracy of classifying the data stream class of the data stream and improve classification generality, and can be applied to a plurality of scenarios such as cloud-based application deployment, application transmission encryption, and a private application.

In a possible implementation, determining a data stream class of the current data stream based on the at least one first confidence and the at least one second confidence includes calculating a comprehensive confidence corresponding to a first data stream class based on the first confidence corresponding to the first data stream class, a weight value of the first confidence, the second confidence corresponding to the first data stream class, and a weight value of the second confidence, where the first data stream class is any one of the at least one data stream class, and if the comprehensive confidence corresponding to the first data stream class is greater than a first preset threshold, determining that the data stream class of the current data stream is the first data stream class.

In the foregoing operations, confidence weights are separately configured for the content classification model and the behavior classification model in advance based on degrees of impact of the two models on a final classification result (the weight configured for the behavior classification model is a weight of the first confidence, and the weight configured for the content classification model is a weight of the second confidence). Therefore, the comprehensive confidence calculated based on the weights of the two confidences can better reflect an actual class of the current data stream. In addition, the first preset threshold is introduced to measure whether the corresponding data stream class is desirable, so that efficiency and accuracy of determining the data stream class can be improved.

In a possible implementation, the processor is further configured to, if the comprehensive confidence corresponding to the first data stream class is less than a second preset threshold, send the feature information of the current data stream and information about the first data stream class to another device (for example, the first device in the method embodiment shown in FIG. 3) through the transceiver, where the second preset threshold is greater than the first preset threshold, receive, through the transceiver, first information sent by the other device (for example, the first device in the method embodiment shown in FIG. 3), where the first information is obtained by the other device (for example, the first device in the method embodiment shown in FIG. 3) based on the feature information of the current data stream and identification information of the first data stream class, and update the content classification model based on the first information, to obtain a new content classification model.

In another possible implementation, the processor is further configured to, if the comprehensive confidence corresponding to the first data stream class is less than a second preset threshold, update the content classification model based on the feature information of the current data stream and information about the first data stream class, to obtain a new content classification model, where the second preset threshold is greater than the first preset threshold.

In the foregoing method, the content classification model is corrected by using a determining result of the data stream class of the current data stream. Further, the second preset threshold is introduced. When the comprehensive confidence corresponding to the first data stream class is less than the second preset threshold, related information of the current data stream is sent to the device to perform training, to obtain the new content classification model, so that a next determining result is more accurate.

In another possible implementation, the updating the content classification model based on the feature information of the current data stream and information about the first data stream class, to obtain a new content classification model includes, if feature information of a first record in a plurality of records is the same as the feature information of the current data stream but a data stream class of the first record is different from the first data stream class, updating the data stream class of the first record to the first data stream class, to obtain a second record, where each of the plurality of records includes feature information and a data stream class, and training a plurality of records including the second record, to obtain the new content classification model.

That is, in a classified record, if feature information of a historical data stream is the same as the feature information of the current data stream but a data stream class of the historical data stream is different from the first data stream class of the current data stream, the data stream class in the record is updated as the first data stream class of the current data stream. This is mainly to adapt to elastic deployment of a cloud resource. For example, a same cloud resource is used for video conferencing in a previous time period, and is used for desktop cloud in a next time period. According to the foregoing method, the data stream class can be updated as the desktop cloud in a timely manner in the next time period, so that the data stream class of the current data stream can still be accurately classified when the cloud resource is elastically deployed.

In another possible implementation, the processor is further configured to, after determining the data stream class of the current data stream based on the at least one first confidence and the at least one second confidence, send information about the data stream class of the current data stream to an OSS through the transceiver, where the information about the data stream class of the current data stream is used by the OSS to generate a traffic control policy for the current data stream.

That is, after the data stream class of the current data stream is determined, related information of the data stream class of the current data stream is notified to the OSS system. In this way, the OSS system can generate the traffic control policy for the current data stream based on the data stream class of the current data stream. For example, when the first data stream class of the current data stream is a video stream of the video conferencing, the traffic control policy corresponding to the current data stream is defined as a policy of preferential transmission, that is, when a plurality of data streams is to be transmitted, the current data stream is preferentially transmitted.

In another possible implementation, the packet length includes one or more of an Ethernet frame length, an IP length, a transport protocol length, and a header length in a packet, and a transport protocol includes a TCP and/or a UDP.

It should be noted that for implementation of the operations, refer to the corresponding description in the method embodiment shown in FIG. 3.

Figure 10:
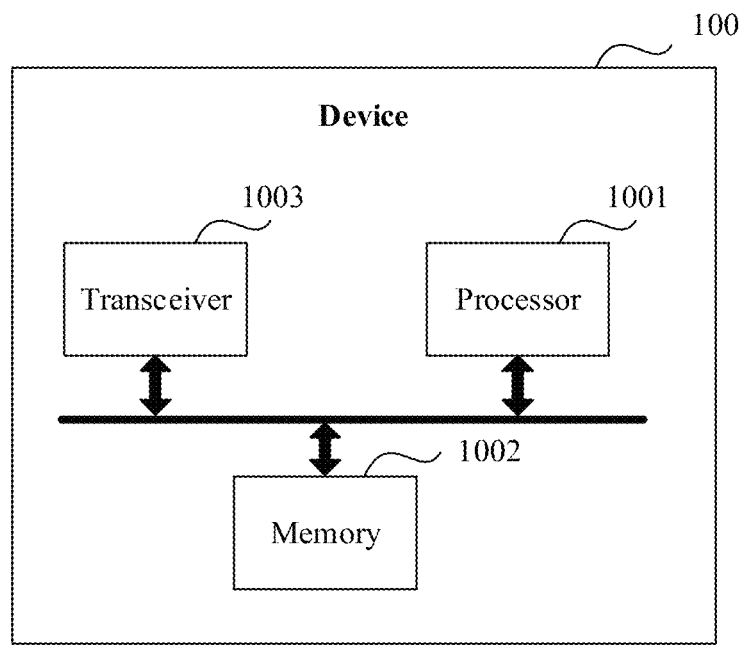
FIG. 10 is a schematic diagram of a structure of another first device according to an embodiment of the present disclosure.

FIG. 10 shows a device 100 according to an embodiment of the present disclosure. The device 100 may be the first device in the method embodiment shown in FIG. 3. The device 100 includes a processor 1001, a memory 1002, and a transceiver 1003. The processor 1001, the memory 1002, and the transceiver 1003 are connected to each other via a bus.

The memory 1002 includes, but is not limited to, a RAM, a ROM, an EPROM, or a CD-ROM. The memory 1002 is configured to store related computer programs and data. The transceiver 1003 is configured to receive and send data.

The processor 1001 may be one or more CPUs. When the processor 1001 is one CPU, the CPU may be a single-core CPU or a multi-core CPU.

The processor 1001 reads computer program code stored in the memory 1002, to perform the following operations: receiving, through the transceiver, feature information and information about a data stream class that are of a current data stream and that are sent by another device (for example, the second device in the method embodiment shown in FIG. 3), generating first information based on the feature information and the information about the data stream class that are of the current data stream, and sending the first information to the other device (for example, the second device in the method embodiment shown in FIG. 3) through the transceiver to update a content classification model, where the content classification model is used to obtain at least one second confidence corresponding to at least one data stream class, the content classification model is a model obtained based on feature information and a data stream class of one or more historical data streams, the data stream class of the historical data stream is obtained based on a behavior classification model, the behavior classification model is a model obtained based on packet features and data stream classes of a plurality of data stream samples, and the packet feature includes one or more of a packet length, a packet transmission speed, a packet time interval, and a packet direction.

In the foregoing operations, the behavior classification model and the content classification model are involved. The behavior classification model is pre-obtained through training based on the packet features and the data stream classes of the plurality of data stream samples, and the content classification model is obtained through training based on the feature information of the data stream and the data stream class that is of the data stream and that is classified by using the behavior model. Therefore, the content classification model is an online learning model. The behavior classification model can classify data stream classes of some basic (or typical) data streams. Some features (such as the packet length and the packet transmission speed) of a data stream of a same class may change in a subsequent transmission process. Therefore, the class of the data stream is classified in other respects (such as a destination address and a protocol type) in combination with an online learning characteristic of the content classification model, to reduce an error in classifying the data stream class of the data stream in the data stream transmission process by using the behavior classification model. As a result, in this application, a classification manner in which the behavior classification model and the content classification model are combined is used to improve accuracy of classifying the data stream class of the data stream and improve classification generality, and can be applied to a plurality of scenarios such as cloud-based application deployment, application transmission encryption, and a private application.

It should be noted that for implementation of the operations, refer to the corresponding description in the method embodiment shown in FIG. 3.

It should be noted that any apparatus embodiment described above is merely an example. The units described as separate parts may or may not be physically separate, and parts displayed as units may or may not be physical units, that is, may be located in one position, or may be distributed on a plurality of network units. Some or all of the modules may be selected based on an actual need to achieve the objectives of the solutions of the embodiments. In addition, in the accompanying drawings of the embodiments of the network device or the host provided in the present disclosure, connection relationships between modules indicate that the modules have a communication connection with each other, which may be further implemented as one or more communication buses or signal cables. A person of ordinary skill in the art may understand and implement the embodiments of the present disclosure without creative efforts.

An embodiment of the present disclosure further provides a chip system. The chip system includes at least one processor, memory, and interface circuit. The memory, the transceiver, and the at least one processor are interconnected through a line, and the at least one memory stores a computer program. When the computer program is executed by the processor, the method procedure shown in FIG. 3 is implemented.

An embodiment of the present disclosure further provides a computer-readable storage medium. The computer-readable storage medium stores a computer program, and when the computer program is run on a processor, the method procedure shown in FIG. 3 is implemented.

An embodiment of the present disclosure further provides a computer program product. When the computer program product runs on a processor, the method procedure shown in FIG. 3 is implemented.

In conclusion, the behavior classification model and the content classification model are involved in this application. The behavior classification model is pre-obtained through training based on the packet features and the data stream classes of the plurality of data stream samples, and the content classification model is obtained through training based on the feature information of the data stream and the data stream class that is of the data stream and that is classified by using the behavior model. Therefore, the content classification model is an online learning model. The behavior classification model can classify data stream classes of some basic (or typical) data streams. Some features (such as the packet length and the packet transmission speed) of a data stream of a same class may change in a subsequent transmission process. Therefore, the class of the data stream is classified in other respects (such as the destination address and the protocol type) in combination with the online learning characteristic of the content classification model, to reduce the error in classifying the data stream class of the data stream in the data stream transmission process by using the behavior classification model. As a result, in this application, the classification manner in which the behavior classification model and the content classification model are combined is used to improve the accuracy of classifying the data stream class of the data stream and improve the classification generality, and can be applied to the plurality of scenarios such as the cloud-based application deployment, the application transmission encryption, and the private application.

A person of ordinary skill in the art may understand that all or some of the processes of the methods in the foregoing embodiments may be implemented by a computer program instructing related hardware. The computer program may be stored in a computer-readable storage medium. When the computer program is run, the processes in the foregoing method embodiments are performed. The foregoing storage medium includes any medium that can store computer program code, such as a ROM, a RAM, a magnetic disk, or an optical disc.

In the embodiments of the present disclosure, "first" in the first device, the first confidence, the first data stream class, the first preset threshold, the first information, and the first record is merely used as a name identifier, and does not represent the first in a sequence. The rule also applies to "second", "third", "fourth", and the like. However, "first" in the first identifier mentioned in the embodiments of the present disclosure represents the first in a sequence. The rule also applies to "$N^{th}$".

The objectives, technical solutions, and benefits of the present disclosure are further described in detail in the foregoing specific implementations. It should be understood that the foregoing description is merely specific implementations of the present disclosure, but are not intended to limit the protection scope of the present disclosure. Any modification, replacement, or improvement made based on the technical solutions of the present disclosure shall fall within the protection scope of the present disclosure.

What is claimed is:

1. A data stream classification method comprising:
obtaining, based on a first packet feature of a current data stream and a behavior classification model, a first confidence that is of the current data stream and that corresponds to at least one data stream class, wherein the behavior classification model is based on second packet features and first data stream classes of a plurality of data stream samples, and wherein the first packet feature comprises one or more of a packet length, a packet transmission speed, a packet time interval, or a packet direction;
obtaining, based on first feature information of the current data stream and a content classification model, a second confidence that is of the current data stream and that corresponds to the at least one data stream class, wherein the first feature information comprises a destination address and a protocol type, wherein the content classification model is based on second feature information of one or more historical data streams and a second data stream class of the one or more historical data streams, and wherein the second data stream class is based on the behavior classification model;
determining, based on the first confidence and the second confidence, a third data stream class of the current data stream;
calculating, based on the first confidence corresponding to a fourth data stream class and the second confidence corresponding to the fourth data stream class, a comprehensive confidence corresponding to the fourth data stream class, wherein the fourth data stream class is any one of the at least one data stream class; and
determining that the third data stream class is the fourth data stream class when the comprehensive confidence is greater than a first preset threshold.

2. The data stream classification method of claim 1, further comprising:
identifying that the comprehensive confidence is less than a second preset threshold;
sending, in response to identifying that the comprehensive confidence is less than the second preset threshold, the first feature information and information about the fourth data stream class to a device, wherein the second preset threshold is greater than the first preset threshold;
receiving, from the device, first information that is based on the first feature information and identification information of the fourth data stream class; and
updating, based on the first information, the content classification model to obtain an updated content classification model.

3. The data stream classification method of claim 1, further comprising updating, based on the first feature information and information about the fourth data stream class, the content classification model to obtain an updated content classification model when the comprehensive confidence is less than a second preset threshold, wherein the second preset threshold is greater than the first preset threshold.

4. The data stream classification method of claim 3, further comprising:
identifying that third feature information of a first record in a plurality of first records is the same as the first feature information and a fifth data stream class of the first record is different from the fourth data stream class;
updating, in response to identifying that the third feature information is the same as the first feature information and the fifth data stream class is different from the fourth data stream class, the fifth data stream class to the fourth data stream class to obtain a second record, wherein each of the first records comprises fourth feature information and a sixth data stream class; and
training a plurality of second records comprising the second record to obtain the updated content classification model.

5. The data stream classification method of claim 1, wherein after determining the third data stream class, the data stream classification method further comprises sending information about the third data stream class to an operations support system (OSS) to enable the OSS to generate a traffic control policy for the current data stream.

6. The data stream classification method of claim 1, wherein the packet length comprises one or more of an Ethernet frame length, an Internet Protocol (IP) length, a transport protocol length of a transport protocol, or a header length in a packet, and wherein the transport protocol comprises a Transmission Control Protocol (TCP) or a User Datagram Protocol (UDP).

7. The data stream classification method of claim 1, wherein the packet length comprises an Ethernet frame length.

8. The data stream classification method of claim 1, wherein the packet length comprises an Internet Protocol (IP) length.

9. The data stream classification method of claim 1, wherein the packet length comprises a transport protocol length of a transport protocol.

10. The data stream classification method of claim 9, wherein the transport protocol comprises a Transmission Control Protocol (TCP).

11. The data stream classification method of claim 9, wherein the transport protocol comprises a User Datagram Protocol (UDP).

12. The data stream classification method of claim 1, wherein the packet length comprises a header length in a packet.

13. A data stream classification method comprising:
receiving, from a device, first feature information of a current data stream and first information about a first data stream class of the current data stream;
generating, based on the first feature information and the first information, second information;
sending, to the device, the second information to update a content classification model, wherein the content classification model obtains a confidence corresponding to at least one data stream class, wherein the content classification model is based on second feature information of one or more historical data streams and a second data stream class of the one or more historical data streams, wherein the second data stream class is based on a behavior classification model, wherein the behavior classification model is based on packet features and third data stream classes of a plurality of data stream samples, and wherein each of the packet features comprises one or more of a packet length, a packet transmission speed, a packet time interval, or a packet direction;

identifying that third feature information of a first record in a plurality of first records is the same as the first feature information and a fourth data stream class of the first record is different from the first data stream class;

updating, in response to identifying that the third feature information is the same as the first feature information and the fourth data stream class is different from the first data stream class, the fourth data stream class to the first data stream class to obtain a second record, wherein each of the first records comprises fourth feature information and a fifth data stream class; and training a plurality of second records comprising the second record to obtain an updated content classification model.

14. A first device comprising:
a memory configured to store instructions; and
one or more processors coupled to the memory, wherein the instructions cause the one or more processors to be configured to:
  obtain, based on a first packet feature of a current data stream and a behavior classification model, a first confidence that is of the current data stream and that corresponds to at least one data stream class, wherein the behavior classification model is based on second packet features and first data stream classes of a plurality of data stream samples, and wherein the first packet feature comprises one or more of a packet length, a packet transmission speed, a packet time interval, or a packet direction;
  obtain, based on first feature information of the current data stream and a content classification model, a second confidence that is of the current data stream and that corresponds to the at least one data stream class, wherein the first feature information comprises a destination address and a protocol type, wherein the content classification model is based on second feature information of one or more historical data streams and a second data stream class of the one or more historical data streams, and wherein the second data stream class is based on the behavior classification model;
  determine, based on the first confidence and the second confidence, a third data stream class of the current data stream;
  calculate, based on the first confidence corresponding to a fourth data stream class and the second confidence corresponding to the fourth data stream class, a comprehensive confidence corresponding to the fourth data stream class, wherein the fourth data stream class is any one of the at least one data stream class; and
  determine that the third data stream class is the fourth data stream class when the comprehensive confidence is greater than a first preset threshold.

15. The first device of claim 14, further comprising a transceiver coupled to the one or more processors, and wherein the instructions further cause the one or more processors to be configured to:
  identify that the comprehensive confidence is less than a second preset threshold;
  send, in response to identifying that the comprehensive confidence is less than the second preset threshold and to a second device through the transceiver, the first feature information and information about the fourth data stream class, wherein the second preset threshold is greater than the first preset threshold;
  receive, through the transceiver and from the second device, first information that is based on the first feature information and identification information of the fourth data stream class; and
  update, based on the first information, the content classification model to obtain an updated content classification model.

16. The first device of claim 14, wherein the instructions further cause the one or more processors to be configured to update, based on the first feature information and information about the fourth data stream class, the content classification model to obtain an updated content classification model when the comprehensive confidence is less than a second preset threshold, and wherein the second preset threshold is greater than the first preset threshold.

17. The first device of claim 16, wherein the instructions further cause the one or more processors to be configured to:
  identify that third feature information of a first record in a plurality of first records is the same as the first feature information and a fifth data stream class of the first record is different from the fourth data stream class;
  update, in response to identifying that the third feature information is the same as the first feature information and the fifth data stream class is different from the fourth data stream class, the fifth data stream class to the fourth data stream class to obtain a second record, wherein each of the first records comprises fourth feature information and a sixth data stream class; and
  train a plurality of second records comprising the second record to obtain the updated content classification model.

18. The first device of claim 14, further comprising a transceiver coupled to the one or more processors, and wherein after determining the third data stream class, the instructions further cause the one or more processors to be configured to send information about the third data stream class to an operations support system (OSS) through the transceiver to enable the OSS to generate a traffic control policy for the current data stream.

19. The first device of claim 14, wherein the packet length comprises one or more of an Ethernet frame length, an Internet Protocol (IP) length, a transport protocol length, and a header length in a packet, and wherein a transport protocol comprises a Transmission Control Protocol (TCP) or a User Datagram Protocol (UDP).

20. A first device comprising:
a memory configured to store instructions;
a transceiver coupled to the memory; and
one or more processors coupled to the memory and the transceiver, wherein the instructions cause the one or more processors to be configured to:
  receive, from a second device and through the transceiver, first feature information of a current data stream and first information about a first data stream class of the current data stream;

generate, based on the first feature information and the first information, second information;

send, to the second device and through the transceiver, the second information to update a content classification model, wherein the content classification model obtains a confidence corresponding to at least one data stream class, wherein the content classification model is based on second feature information of one or more historical data streams and a second data stream class of the one or more historical data streams, wherein the second data stream class is based on a behavior classification model, wherein the behavior classification model is based on packet features and third data stream classes of a plurality of data stream samples, and wherein each of the packet features comprises one or more of a packet length, a packet transmission speed, a packet time interval, or a packet direction;

identify that third feature information of a first record in a plurality of first records is the same as the first feature information and a fourth data stream class of the first record is different from the first data stream class;

update, in response to identifying that the third feature information is the same as the first feature information and the fourth data stream class is different from the first data stream class, the fourth data stream class to the first data stream class to obtain a second record, wherein each of the first records comprises fourth feature information and a fifth data stream class; and train a plurality of second records comprising the second record to obtain an updated content classification model.

* * * * *